(12) United States Patent
Khosla et al.

(10) Patent No.: US 10,550,483 B2
(45) Date of Patent: Feb. 4, 2020

(54) FIRE-RETARDANT COMPOSITIONS AND THEIR USES

(71) Applicant: PERIMETER SOLUTIONS LP, Webster Groves, MO (US)

(72) Inventors: Urvashi Khosla, St. Louis, MO (US); Howard L. Vandersall, Upland, CA (US); Melissa R. Kim, St. Louis, MO (US)

(73) Assignee: Perimeter Solutions LP, Clayton, MO (US)

(*) Notice: Subject to any disclaimer, the term of this patent is extended or adjusted under 35 U.S.C. 154(b) by 87 days.

(21) Appl. No.: 15/670,422

(22) Filed: Aug. 7, 2017

(65) Prior Publication Data

US 2018/0037998 A1 Feb. 8, 2018

Related U.S. Application Data

(60) Provisional application No. 62/372,012, filed on Aug. 8, 2016.

(51) Int. Cl.
| | | |
|---|---|---|
| C23F 11/167 | (2006.01) | |
| C09K 21/04 | (2006.01) | |
| C08L 5/00 | (2006.01) | |

(52) U.S. Cl.
CPC .............. *C23F 11/167* (2013.01); *C08L 5/00* (2013.01); *C08L 2201/02* (2013.01)

(58) Field of Classification Search
None
See application file for complete search history.

(56) References Cited

U.S. PATENT DOCUMENTS

| | | | |
|---|---|---|---|
| 3,423,343 A | | 1/1969 | Barnett |
| 3,941,896 A | | 3/1976 | Smith et al. |
| 4,983,326 A | | 1/1991 | Vandersall |
| 6,162,375 A | * | 12/2000 | Crouch ............... A62D 1/0014 252/601 |
| 6,395,200 B2 | * | 5/2002 | Crouch ............... A62D 1/0014 252/601 |
| 6,432,155 B1 | | 8/2002 | Swazey et al. |
| 8,781,278 B2 | | 7/2014 | Karayianni |
| 2001/0035517 A1 | * | 11/2001 | Crouch ............... A62D 1/0014 252/2 |
| 2002/0096668 A1 | | 7/2002 | Vandersall et al. |
| 2003/0204004 A1 | | 10/2003 | Vandersall et al. |
| 2003/0212177 A1 | | 11/2003 | Vandersall et al. |
| 2016/0030789 A1 | * | 2/2016 | Cordani ............... A62D 1/0014 252/2 |
| 2018/0037998 A1 | * | 2/2018 | Khosla ................ C09K 21/04 |

OTHER PUBLICATIONS

International Preliminary Report on Patentability dated Feb. 21, 2019 in PCT/US2017/045714, 6 pages.
International Search Report and Written Opinion for PCT/US2017/045714 dated Oct. 20, 2017.

* cited by examiner

*Primary Examiner* — Joseph D Anthony
(74) *Attorney, Agent, or Firm* — Stinson LLP

(57) ABSTRACT

Disclosed are fire-retardant concentrates and solutions comprising mixtures of ammonium phosphates. In certain embodiments, less of the concentrate is needed to form an effective fire-retardant solution. In certain embodiments, the fire-retardant solutions exhibit decreased corrosion, especially with regard to magnesium. In certain embodiments, the fire-retardant solutions exhibit decreased aquatic toxicity.

30 Claims, 1 Drawing Sheet

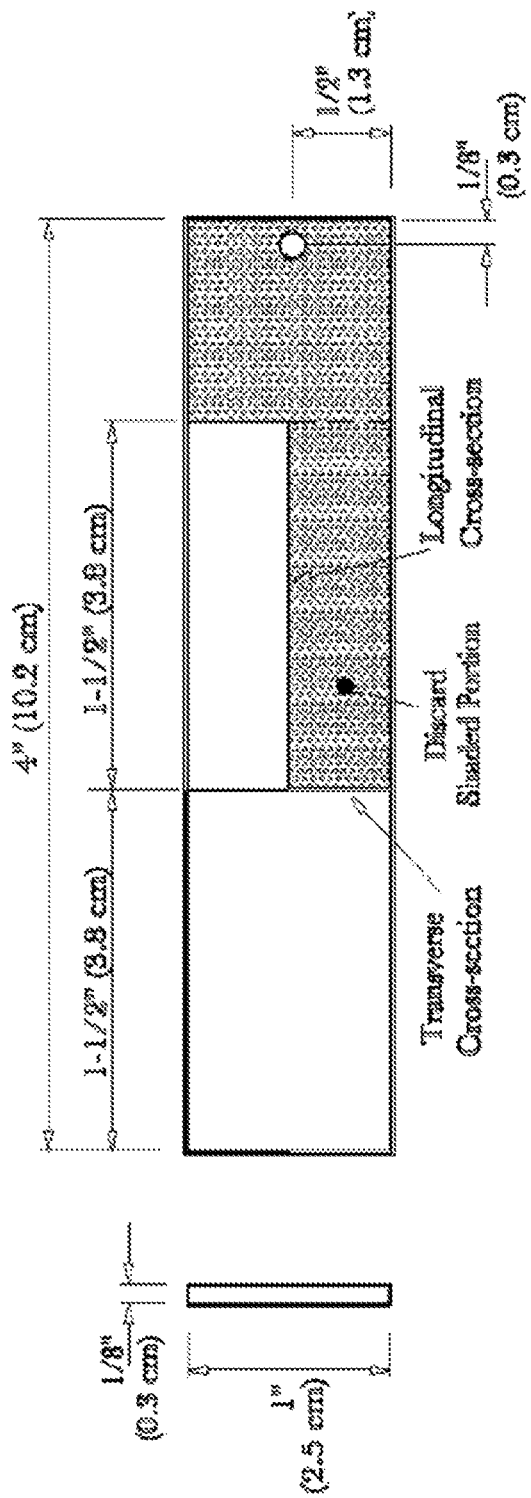

FIRE-RETARDANT COMPOSITIONS AND THEIR USES

CROSS-REFERENCE TO RELATED APPLICATIONS

This application is a non-provisional U.S. patent application that claims the benefit of U.S. Provisional Patent Application No. 62/372,012, filed Aug. 8, 2016, the entirety of which is hereby incorporated by reference.

BACKGROUND

The use of fire-retardant compositions to prevent and suppress flame intensity and rate of spread in wildland fires has been known since the 1950s. It should be understood that there are both short-term and long-term fire-retardants. Short-term retardants, also called suppressants or water enhancers, depend entirely on their contained water to cool the fire. Once their contained water evaporates, they are no longer effective. Water, itself can be considered a short-term retardant or suppressant. Bentonite clay and super absorbent polymers (SAP) are formulated examples of short-term retardants that are more effective than water because they are generally viscous and, consequently tend to remain where applied whereas liquid water runs off of the fuel onto the ground. Long-term fire-retardants, on the other hand, convert wildland vegetation from a substance that is flammable and, consequently, a fuel, to a substance that has been chemically modified or converted to a substance that does not ignite and provide fuel when heated to and beyond its ignition point by the advancing fire. Ammonium phosphate based long-term fire-retardants are the subject of this technology. They function by reacting with the fuel, converting it to a substance that does not release flammable gases when heated, but rather, decomposes to a graphic-like carbon via dehydration. This type of retardant is effective until it is removed from the vegetative fuel by either rain or some physical means. Many different types of long-term fire-retardants have been used, for example, sodium calcium borate, monoammonium and diammonium orthophosphate, diammonium sulfate, and aqueous solutions of ammonium polyphosphates that contains a mixture of ortho, pyro, and short chain polyphosphates. Ammonium phosphates are the long-term retardants specified by many agencies with responsibility for the prevention and management of wildland fire.

Fire-retardant application can be made from either aerial or ground vehicles, e.g., fixed-wing aircraft, rotatory wing aircraft (e.g., helicopters), and ground engines. Aerial attack is most commonly used when the fire is in areas not easily or quickly accessible from the ground. Typically, fire-retardants are supplied to the user as a dry or liquid concentrate which is subsequently mixed with water to form a solution containing a prescribed amount of fire-retardant concentrate per unit volume before or during loading the fire-retardant solution into the application vehicle. The prescription for the solution is determined by performance criteria when subjected to a standard fire test.

Fire-retardant solutions applied to fuels threatened by fire may accidently reach streams, rivers, lakes, ponds, and other waterways and wetland habitats. Consequently, it is desirable that fire-retardant solutions exhibit low aquatic toxicity. Since ammonia is toxic to many aquatic species, it is desirable that the fire-retardant solution contain a low ammonia content, consequently, there remains a need for fire-retardant solutions that contain reduced amounts of ammonia per unit volume.

SUMMARY

Provided herein are fire-retardant concentrate compositions comprising a mixture of ammonium phosphates and a corrosion inhibitor system that comprises at least one biopolymer. In certain embodiments, the mixture of ammonium phosphates has a molar ratio of ammoniacal nitrogen to phosphorus (N/P molar ratio) in a range of from about 1.1 to about 1.9. In certain embodiments, the N/P molar ratio is from about 1.35 to about 1.65. In certain embodiments, the N/P molar ratio is from about 1.4 to about 1.6.

In certain embodiments of a fire-retardant concentrate composition disclosed herein, the amount of ammonium phosphate in the fire-retardant concentrate is from about 75% to about 97% by weight of the total concentrate composition. In certain embodiments, the ammonium phosphates comprise a mixture of at least two ammonium phosphates selected from the group consisting of ammonium orthophosphates, ammonium pyrophosphates, and ammonium polyphosphates having an average chain length of less than 20 phosphorus atoms. In certain embodiments, the fire-retardant concentrate composition comprises at least two ammonium orthophosphates or at least two ammonium pyrophosphates. In certain embodiments, the fire-retardant concentrate composition comprises at least one ammonium orthophosphate and at least one ammonium pyrophosphate.

In certain embodiments of a fire-retardant concentrate composition disclosed herein, the mixture of ammonium phosphates comprises monoammonium orthophosphate (MAP) and diammonium orthophosphate (DAP). In certain other embodiments, the mixture of ammonium phosphates consists essentially of monoammonium phosphate (MAP) and diammonium phosphate (DAP). In certain embodiments, the mixture of ammonium phosphates comprises: MAP containing from about 10% to about 12% ammoniacal nitrogen by weight and from about 40% to about 61% phosphorus pentoxide by weight; and DAP containing from about 16% to about 21% ammoniacal nitrogen by weight and from about 40% to about 54% phosphorus pentoxide by weight. In certain embodiments, the mixture of ammonium phosphates comprises: MAP containing about 11% to about 12% ammoniacal nitrogen by weight and about 55% to about 61% phosphorus pentoxide by weight; and DAP containing about 16% to about 21% ammoniacal nitrogen by weight and about 40% to about 54% phosphorus pentoxide by weight. In certain embodiments, the weight ratio of MAP to DAP is in the range of from about 5% to about 60% MAP to about 40% to about 95% DAP of the total ammonium phosphate in the concentrate. In certain embodiments, the weight ratio of MAP to DAP is in the range of from about 40% to about 60% MAP to about 40% to about 60% DAP of the total ammonium phosphate in the concentrate. In certain embodiments, the weight ratio of MAP to DAP is in the range of from about 50% to about 60% MAP and about 40% to about 50% DAP of the total ammonium phosphate in the concentrate.

In certain embodiments of a fire-retardant concentrate composition disclosed herein, the biopolymer portion of the corrosion inhibitor system is in an amount of from about 2.0% to about 8.5% by weight of the total concentrate composition. In certain embodiments, the biopolymer is in an amount of from about 2.0% to about 3.0% by weight of the total concentrate composition. In certain embodiments, the corrosion inhibitor system further comprises anhydrous sodium molybdate, its dihydrate, or mixtures thereof. In certain embodiments, the amount of anhydrous sodium molybdate, its dihydrate, or mixtures thereof is in a range of about 0.01% to about 2.0% by weight of the total concentrate composition. In certain embodiments, the amount of anhydrous sodium molybdate, its dihydrate, or mixtures thereof is in a range of about 0.05% to about 0.3% by weight of the total concentrate composition. In certain embodiments, the amount of anhydrous sodium molybdate, its dihydrate, or mixtures thereof is in a range of from about 0.01% to about 2.0% by weight of the total concentrate composition and the biopolymer is in an amount of from about 2.5% to about 8.5% by weight of the total concentrate composition.

In certain embodiments of a fire-retardant concentrate composition disclosed herein, the biopolymer is selected from the group consisting of xanthan gum, rhamsan gum, welan gum, diutan gum, and mixtures thereof. In certain embodiments, the biopolymer is xanthan gum. In certain embodiments, the xanthan gum is in an amount of from about 2.0% to about 3.0% by weight of the total concentrate composition. In certain embodiments, the biopolymer is diutan gum. In certain embodiments, the diutan is in an amount of from about 2.0% to about 3.0% by weight of the total concentrate composition.

In certain embodiments of a fire-retardant concentrate composition disclosed herein, the fire-retardant concentrate composition further comprises a pigment or dye. In certain embodiments, the pigment or dye is a fluorescent pigment or dye. In certain embodiments, the pigment or dye is UV sensitive and/or formaldehyde-free. In certain embodiments, the fluorescent pigment or dye has a Lab color spacing of "L" in a range from about 34 to about 89, "a" in a range from about 18 to about 83 and "b" in a range from about −61 to about 56.

In certain embodiments of a fire-retardant concentrate composition disclosed herein, the composition comprises one or more additives selected from the group consisting of a flow conditioner, a surfactant, a foam controlling additive, a foam former, a biocide, and any combination thereof.

In certain embodiments of a fire-retardant concentrate composition disclosed herein, when the concentrate composition is mixed at a ratio of from about 0.9 to about 1.05, 1.1, 1.14, 1.2, or 1.3 pounds of the concentrate per 1.0 gallon of water, the resulting aqueous solution exhibits a magnesium alloy corrosion rate equal to or less than 4.0 milli-inches per year. In certain embodiments, when the concentrate composition is mixed at a ratio of from about 0.9 to about 1.05, 1.1, 1.14, 1.2, or 1.3 pounds of the concentrate per 1.0 gallon of water, the resulting aqueous solution exhibits a magnesium alloy corrosion rate equal to or less than 3.0 milli-inches per year. In certain embodiments, when the concentrate composition is mixed at a ratio of from about 0.9 to about 1.05, 1.1, 1.14, 1.2, or 1.3 pounds of the concentrate per 1.0 gallon of water, the resulting aqueous solution exhibits an aluminum corrosion rate equal to or less than 2.0 milli-inches per year. In certain embodiments, when the concentrate composition is mixed at a ratio of from about 0.9 to about 1.05, 1.1, 1.14, 1.2, or 1.3 pounds of the concentrate per 1.0 gallon of water, the resulting aqueous solution meets all of the required corrosion criteria of U.S. Department of Agriculture, Forest Service, Specification Number 5100-304c, Long Term Retardant, Wildland Firefighting, June 2007, including all amendments. In certain embodiments, when the concentrate composition is mixed at a ratio of from about 0.9 to about 1.05, 1.1, 1.14, 1.2, or 1.3 pounds of the concentrate per 1.0 gallon of water, the resulting aqueous solution meets all of the required stability criteria of U.S. Department of Agriculture, Forest Service, Specification Number 5100-304c, Long Term Retardant, Wildland Firefighting, June 2007, including all amendments. In certain embodiments, when the concentrate composition is mixed at a ratio of from about 0.9 to about 1.05, 1.1, 1.14, 1.2, or 1.3 pounds of the concentrate per 1.0 gallon of water, the resulting aqueous solution meets all of the required corrosion and stability criteria of U.S. Department of Agriculture, Forest Service, Specification Number 5100-304c, Long Term Retardant, Wildland Firefighting, June 2007, including all amendments.

Provided herein are fire-retardant solutions prepared by the method of mixing a fire-retardant concentrate composition disclosed herein with water. In certain embodiments, from about 0.9 pounds to about 1.05, 1.1, 1.14, 1.2, or 1.3 pounds of the fire-retardant concentrate composition is added per 1.0 gallon of water. In certain embodiments, from about 0.9 pounds to about 1.2 pounds of the fire-retardant concentrate composition is added per 1.0 gallon of water. In certain embodiments, the fire-retardant solution is a homogenous solution comprising the fire-retardant concentrate composition and water. In certain embodiments, the solution contains suspended water-insolubles. In certain embodiments, the fire-retardant solution exhibits a viscosity in the range of from about 150 cPs to about 1500 cPs.

In certain embodiments of a fire-retardant solution disclosed herein, the solution exhibits a magnesium alloy corrosion rate equal to or less than 4.0 milli-inches per year. In certain embodiments, the solution exhibits a magnesium alloy corrosion rate equal to or less than 3.0 milli-inches per year. In certain embodiments, the solution exhibits an aluminum corrosion rate equal to or less than 2.0 milli-inches per year. In certain embodiments, the solution meets all of the required corrosion criteria of U.S. Department of Agriculture, Forest Service, Specification Number 5100-304c, Long Term Retardant, Wildland Firefighting, June 2007, including all amendments. In certain embodiments, the solution meets all of the required stability criteria of U.S. Department of Agriculture, Forest Service, Specification Number 5100-304c, Long Term Retardant, Wildland Firefighting, June 2007, including all amendments. In certain embodiments, the solution meets all of the required corrosion and stability criteria of U.S. Department of Agriculture, Forest Service, Specification Number 5100-304c, Long Term Retardant, Wildland Firefighting, June 2007, including all amendments.

In certain embodiments of a fire-retardant solution disclosed herein, the solution exhibits an aquatic toxicity (LC50) in the range of from about 180 milligrams per liter to about 2700 milligrams per liter. In certain embodiments, the solution exhibits an aquatic toxicity (LC50) greater than 180 milligrams per liter.

In certain embodiments of a fire-retardant solution disclosed herein, the solution has a pH not greater than about pH 8.0. In certain embodiments, the solution has a pH not greater than about pH 7.58. In certain embodiments, the solution has an acidic pH.

Provided herein are methods of producing a fire-retardant solution. In certain embodiments, the method comprises mixing from about 0.9 to about 1.05, 1.1, 1.14, 1.2, or 1.3 pounds of a fire-retardant concentrate composition disclosed herein per 1.0 gallons of water to produce a fire-retardant solution. In certain embodiments, the method comprises mixing from about 0.9 to about 1.2 pounds of a fire-retardant concentrate composition disclosed herein per 1.0 gallons of water. In certain embodiments, the fire-retardant solution produced is a fire-retardant solution disclosed herein.

Provided herein are methods of combatting a wildfire comprising applying a fire-retardant solution disclosed herein either directly onto flaming fuel or indirectly onto the fuel ahead of a potentially advancing fire front. In certain embodiments, the fire-retardant solution is applied from a ground platform, an aerial platform, or from both. In certain embodiments, the fire-retardant solution is applied from a rotary wing aircraft. In certain embodiments, the fire-retardant solution is applied from a device consisting of a helicopter bucket, an internal tank, or a tank directly attached to the exterior of the delivery platform.

BRIEF DESCRIPTION OF THE DRAWINGS/FIGURES

FIG. 1 is a diagram for cutting and examining coupons for intergranular corrosion from U.S. Department of Agriculture, Forest Service, Specification Number 5100-304c, Long Term Retardant, Wildland Firefighting, June 2007.

DETAILED DESCRIPTION

Definitions

It is to be noted that the term "a" or "an" entity refers to one or more of that entity; for example, "a plant," is understood to represent one or more plants. As such, the terms "a" (or "an"), "one or more," and "at least one" can be used interchangeably herein.

Furthermore, "and/or" where used herein is to be taken as specific disclosure of each of the two specified features or components with or without the other. Thus, the term and/or" as used in a phrase such as "A and/or B" herein is intended to include "A and B," "A or B," "A" (alone), and "B" (alone). Likewise, the term "and/or" as used in a phrase such as "A, B, and/or C" is intended to encompass each of the following embodiments: A, B, and C; A, B, or C; A or C; A or B; B or C; A and C; A and B; B and C; A (alone); B (alone); and C (alone).

Unless defined otherwise, technical and scientific terms used herein have the same meaning as commonly understood by one of ordinary skill in the art to which this disclosure is related.

Numeric ranges are inclusive of the numbers defining the range.

The headings provided herein are solely for ease of reference and are not limitations of the various aspects or aspects of the disclosure, which can be had by reference to the specification as a whole. Accordingly, the terms defined immediately below are more fully defined by reference to the specification in its entirety.

As used herein, the terms "concentrate," "retardant concentrate," and "fire-retardant concentrate" can be used interchangeably to mean a concentrated product that is mixed with water to prepare a fire-retardant solution prior to application.

As used herein, the phrase "fire-retardant solution" includes suspensions of soluble and insoluble components.

As used herein, the phrase "corrosion inhibitor system" means a component or mixture of components that reduce the corrosion of fire-retardant concentrates and solutions. In certain embodiments, a corrosion inhibitor system reduces the corrosion of fire-retardant concentrates and solutions to within some or all of the requirements of paragraphs 3.7.1, 3.7.2, 4.7.1 and 4.7.2 in the U.S.D.A. Forest Service Specification 5100-304c, Jun. 1, 2007 all Amendments.

As used herein, the term "free flowing" means that the substance will easily flow from or can be sucked from a container via a source of vacuum.

As used herein, the terms "powder, granular, or powder and granular form" means that the substance is composed of a distribution of particle sizes ranging from about 10 microns to about 900 microns.

As used herein, the "corrosion rate" of a fire-retardant concentrate or fire-retardant solution expressed in milli-inches per year (MPY) with respect to a metal is determined by the methods described in Section 4.7.1 and 4.7.2 of Forest Service Specification 5100-304c, Jun. 1, 2007 and all Amendments.

As used herein, the qualifier "ammoniacal," placed in front of nitrogen (i.e., "ammoniacal nitrogen"), when referring to the nitrogen to phosphorus molar ratio (N/P) specifies that the amount of nitrogen used to determine the N/P ratio is only that nitrogen present in the ammonium phosphate, and thus, if other nitrogen is present in the fire-retardant concentrate from other sources, this other nitrogen would not be considered when calculating the N/P ratio.

Overview

Long-term fire-retardant concentrate compositions described in this disclosure and solutions made therefrom are advantageous over prior compositions and solutions in terms of, for example, retardant concentrate effectiveness, solution stability, aquatic toxicity, visibility upon wildland fuels immediately after application, and the lack of long-term aesthetic impact. Certain embodiments of compositions disclosed herein can include, but are not limited to, mono-ammonium orthophosphate (MAP), diammonium orthophosphate (DAP), ammonium pyrophosphates, ammonium tripolyphosphates, ammonium tetrapolyphosphates, and other ammonium polyphosphates, alkaline earth substituted versions of all these examples, and mixtures thereof. In certain embodiments, the ammonium polyphosphates have an average chain length of less than 20 phosphorus atoms. The compositions also comprise a corrosion inhibitor system comprising at least one biopolymer. Representative examples of biopolymers include xanthan gum, rhamsan gum, welan gum, diutan gum, and mixtures thereof. Diutan gum is a water soluble biopolymer produced by fermentation for use in a variety of industrial applications. It is believed that such biopolymers impact both the rheological properties and the corrosion properties of the fire-retardant solutions. In certain embodiments, the corrosion is magnesium corrosion. Fire-retardant solutions made from fire-retardant concentrates can be transferred to application vehicles and applied either aerially or from the ground in the manner best suited to obtain and maintain control of a fire. Magnesium corrosion is a concern especially when helicopters are used for the application of the fire-retardant solution because magnesium is used to fabricate critical components in helicopters but not necessarily other types of delivery vehicles. In certain embodiments, fire retardant concentrates and solutions exhibit low levels of magnesium corrosion and their use is Federal and/or State qualified. Such solutions can be effective in preventing the spread of fire in wildland situations and from one structure to another.

Compositions, solutions, and suspensions described herein can contain less ammonia per unit volume of fire-retardant solution than previous long-term fire retardant solutions suitable for application from rotary-wing aircraft. The amount of fire-retardant concentrate required per unit volume/weight of solution can be lower than similar compositions, resulting in the need of less total chemical to gain control of a fire. In certain embodiments, fire-retardant solutions can be considerably more visible to firefighting personnel during firefighting activities which can aid in better placement of the fire-retardant solution and consequently can result in the use of considerably less fire-retardant solution to gain control of the incident. In certain embodiments, magnesium corrosion is reduced, which is advantageous because magnesium is a major material of construction of rotary wing aircraft.

The control of magnesium corrosion has generally been possible when using only basic diammonium phosphate containing fire retardant solutions. It has now been discovered, however, that the formulations described herein can meet the low USDA Forest Service magnesium corrosion requirements. In certain embodiments, a composition or solution meeting the low USDA Forest Service magnesium corrosion requirement is an acidic mixture of ammonium phosphates.

Fire-Retardant Concentrate Compositions

The present disclosure provides for fire-retardant concentrate compositions comprising a mixture of ammonium phosphates, for example, ammonium salts of ortho, pyro, tripoly, or tetrapoly phosphoric acid. In certain embodiments, the fire-retardant concentrate composition is a free flowing powder and/or granular material. In certain embodiments, the particle sizes range from any of about 10 microns to about 900 microns. In certain embodiments, the particle sizes range from any of about 10, 20, 30, 35, 37, 40, or 50 microns to about 900 microns. In certain embodiments, the particle sizes range from any of about 10, 20, 30, 35, 37, 40, or 50 microns to about 800 microns. In certain embodiments, the particle sizes range from any of about 10, 20, 30, 35, 37, 40, or 50 microns to about 700 microns. In certain embodiments, the particle sizes range from any of about 10, 20, 30, 35, 37, 40, or 50 microns to about 600 microns. In certain embodiments, the particle sizes range from any of about 10, 20, 30, 35, 37, 40, or 50 microns to about 500 microns. In certain embodiments, the particle sizes range from any of about 10, 20, 30, 35, 37, 40, or 50 microns to about 400 microns. In certain embodiments, the particle sizes range from any of about 10, 20, 30, 35, 37, 40, or 50 microns to about 300 microns. In certain embodiments, the particle sizes range from any of about 10, 20, 30, 35, 37, 40, or 50 microns to about 200 microns. In certain embodiments, the particle sizes range from about 37 to about 400 microns. In certain embodiments, the mixture of ammonium phosphates has a molar ratio of ammoniacal nitrogen to phosphorus (N/P ratio) in a range from about 1.1 to about 1.9. In certain embodiments, the mixture of ammonium phosphates has a molar ratio of ammoniacal nitrogen to phosphorus (N/P ratio) in a range from about 1.35 to about 1.65. In certain embodiments, the mixture of ammonium phosphates has a molar ratio of ammoniacal nitrogen to phosphorus (N/P ratio) in a range from about 1.4 to about 1.6. In certain embodiments, the mixture of ammonium phosphates has a molar ratio of ammoniacal nitrogen to phosphorus (N/P ratio) in a range from any of about 1.1, 1.2, 1.3, 1.35, 1.4, 1.5, 1.6, 1.7, or 1.8 to any of about 1.2, 1.3, 1.4, 1.5, 1.6, 1.65, 1.7, 1.8, or 1.9. The concentrate and its solutions generally contain less ammonia in comparison with previous products, and can result for example, in a lower aquatic toxicity.

The mixture of ammonium phosphates is generally the predominate component of the fire-retardant concentrate composition. In certain embodiments, the amount of the mixture of the ammonium phosphates is greater than about 60%, 65%, 70%, 75%, 80%, 85%, 90%, 95%, or 96% by weight of the total concentrate composition. In certain embodiments, the amount of the mixture of the ammonium phosphates is not more than about 90%, 95%, 96%, or 97% by weight of the total concentrate composition. In certain embodiments, the amount of the mixture of the ammonium phosphates is from about 75% to about 97% by weight of the total concentrate composition. In certain embodiments, the amount of the mixture of the ammonium phosphates is from about 80% to about 97% by weight of the total concentrate composition. In certain embodiments, the amount of the mixture of the ammonium phosphates is from about 90% to about 97% by weight of the total concentrate composition. In certain embodiments, the amount of the mixture of the ammonium phosphates is from about 95% to about 97% by weight of the total concentrate composition. In certain embodiments, the amount of the mixture of the ammonium phosphates is from any of about 60%, 65%, 70%, 75%, 80%, 85%, 90%, 95%, or 96% to any of about 65%, 70%, 75%, 80%, 85%, 90%, 95%, 96%, or 97% by weight of the total concentrate composition.

A mixture of ammonium phosphates comprises at least two ammonium phosphates. In certain embodiments, the mixture comprises at least two, at least three, or at least four ammonium phosphates. Representative ammonium phosphates include ammonium orthophosphates, ammonium pyrophosphates, ammonium tripolyphosphates, ammonium tetrapolyphosphates, and other ammonium polyphosphates having an average chain length less than 20 (e.g., less than 20, 19, 18, 17, 16, 15, 14, 13, 12, 11, 10, 9, 8, 7, 6, or 5). In certain embodiments, the mixture of ammonium phosphates comprises, consists essentially of, or consists of monoammonium orthophosphate (MAP) and diammonium orthophosphate (DAP). In certain embodiments, the MAP contains from about 10% or 11% to about 12% ammonia by weight and from about 40% or 55% to about 61% phosphorus pentoxide by weight. In certain embodiments, the DAP contains from about 16% to about 21% ammonia by weight and from about 40% to about 54% phosphorus pentoxide by weight. Further, in certain embodiments, the weight ratio of MAP to DAP is in the range of from about 5% to about 60% MAP to about 40% to about 95% DAP of the total ammonium phosphate in the concentrate. In certain embodiments, the weight ratio of MAP to DAP is in the range of from about 40% to about 60% MAP to about 40% to about 60% DAP of the total ammonium phosphate in the concentrate. In certain embodiments, the weight ratio of MAP to DAP is in the range of from about 50% to about 60% MAP to about 40% to about 50% DAP of the total ammonium phosphate in the concentrate.

The fire-retardant concentrate compositions of the present disclosure also comprise a corrosion inhibitor system comprising at least one biopolymer. It has been discovered that biopolymer containing solutions exhibit reduced corrosion, and in particular, reduced magnesium corrosion. Thus, the compositions are well-suited for application from, for example, tanks mounted within or externally attached to the heli-tanker (a tanked rotary wing aircraft). In certain embodiments, the biopolymer portion of the corrosion inhibitor system is in an amount of from about 2.0% or 2.5% to about 8.5% by weight of the total concentrate composition. In certain embodiments, the biopolymer portion of the corrosion inhibitor system is in an amount of from about 2.0% to about 3.0% by weight of the total concentrate composition. In certain embodiments, the biopolymer portion of the corrosion inhibitor system is in an amount of from any of about 0.5%, 1.0%, 2.0%, 2.5%, 3.0%, 4.0% or 5.0% to any of about 1.0%, 2.0%, 2.5%, 3.0%, 4.0%, 5.0%, or 8.5% by weight of the total concentrate composition. Representative examples of biopolymers include xanthan gum, rhamsan gum, welan gum, diutan gum, and mixtures thereof. In certain embodiments, the biopolymer is xanthan gum in an amount disclosed herein for a biopolymer. In certain embodiments, the amount of xanthan gum is from about 2.0% to about 3.0% by weight of the total concentrate composition.

In addition to a biopolymer, the corrosion inhibitor system can comprise additional components. In certain embodiments, the corrosion inhibitor system further comprises anhydrous sodium molybdate, its dihydrate, or mixtures thereof. In certain embodiments, the amount of anhydrous sodium molybdate, its dihydrate, and mixtures thereof is from about 0.01% to about 2.0% by weight of the total concentrate concentration. In certain embodiments, the amount of anhydrous sodium molybdate, its dihydrate, mixtures thereof is from about 0.05% to about 0.3% by weight of the total concentrate concentration. In certain embodiments, the amount of anhydrous sodium molybdate, its dihydrate, and mixtures thereof is from any of about 0.01%, 0.05%, 0.1%, 0.2%, 0.3%, 0.4%, or 0.5% to any of about 0.05%, 0.1%, 0.2%, 0.3%, 0.5%, 0.6%, 0.7%, 0.8%, 0.9%, 1.0%, 2.0% or 3.0% by weight of the total concentrate composition.

In certain embodiments, the corrosion inhibitor system can optionally comprise one or more components such as sodium silicofluoride (SSF), sodium thiosulfate (STS), and dimercaptothiadiazole (DMTD). However, in certain embodiments, these corrosion inhibitor components are not required. In certain embodiments, the corrosion inhibitor system does not contain one or more of sodium silicofluoride (SSF), sodium thiosulfate (STS), and dimercaptothiadiazole (DMTD). Likewise, in certain embodiments, a solution produced from a fire-retardant concentrate composition described herein may or may not contain one or more of sodium silicofluoride (SSF), sodium thiosulfate (STS), and dimercaptothiadiazole (DMTD).

In certain embodiments, the fire-retardant concentrate composition comprises additional components, for example, benzotriazole, tolyltriazole, sodium benzoate, mercaptobenzothiazole, or combinations thereof. In certain embodiments, the fire-retardant concentrate composition comprises a pigment or dye. In certain embodiments, the pigment or dye is a fluorescent pigment or dye. In certain embodiments, the pigment or dye is UV sensitive. In certain embodiments, the pigment or dye is formaldehyde-free. In certain embodiments, a fluorescent pigment or dye has a Lab color spacing of "L" in a range from about 34 to about 89, "a" in a range from about 18 to about 83 and "b" in a range from about −61 to about 56. The LAB color space model was developed by the International Commission of Illumination (CIE) and is one convention of describing colors. The model has a 3 axis system. The L* represents the lightness and is on the vertical axis. The "0" on bottom of the vertical axis indicates the absence of light. The maximum lightness is on the top "100". The a* is on the horizontal axis indicating red (−a) to green (a+). The b* is on the horizontal axis indicating blue (−b) to yellow (+b). The center of the axis is neutral.

www.colourphil.co.uk/lab_lch_colour_space.shtml

Additional components can include one or more selected from the group consisting of an iron containing pigment, a titanium containing pigment, a fugitive pigment or dye, a flow conditioner (e.g., tricalcium phosphate or micronized silica), a surfactant, a foam controlling additive (e.g., PLURONIC® L-101), foam formers, biocides, and any combination thereof.

In certain embodiments, a fire-retardant composition is mixed with water to form an aqueous fire-retardant solution, such as in any ratio as described for fire-retardant solutions herein (the "prescribed ratio"). When reference is made to the corrosion rate of a metal, such as a magnesium alloy, aluminum, etc., the metal composition referred to is that tested in accordance with U.S. Department of Agriculture, Forest Service, Specification Number 5100-304c, Long Term Retardant, Wildland Firefighting, June 2007, including all amendments.

In certain embodiments, the prescribed ratio of a fire-retardant is predetermined based on the performance of its fire-retardant solutions when tested in accordance with U.S.D.A. Forest Service Specification 5100-304c, ¶ 3.5.2 or 4.5. In certain embodiments, when a fire-retardant composition is mixed with water at the prescribed ratio, the resulting aqueous solution exhibits a magnesium alloy corrosion rate equal to or less than 4.0 milli-inches per year (mpy). In certain embodiments, when a fire-retardant composition is mixed with water at the prescribed ratio, the resulting aqueous solution exhibits a magnesium alloy corrosion rate equal to or less than 3.0 milli-inches per year. In certain embodiments, when a fire-retardant composition is mixed with water at the prescribed ratio, the resulting aqueous solution exhibits a magnesium alloy corrosion rate equal to or less than 2.0 milli-inches per year. In certain embodiments, when a fire-retardant composition is mixed with water at the prescribed ratio, the resulting aqueous solution exhibits a magnesium alloy corrosion rate equal to or less than 1.0 milli-inches per year. In certain embodiments, when a fire-retardant composition is mixed with water at the prescribed ratio, the resulting aqueous solution exhibits an aluminum corrosion rate equal to or less than 2.0 milli-inches. In certain embodiments, when a fire-retardant composition is mixed with water at the prescribed ratio, the resulting aqueous solution exhibits a mild steel corrosion rate equal to or less than 5.0 milli-inches per year. In certain embodiments, when a fire-retardant composition is mixed with water at the prescribed ratio, the resulting aqueous solution exhibits a brass corrosion rate equal to or less than 5.0 milli-inches per year. In certain embodiments, when a fire-retardant composition is mixed with water at the prescribed ratio, the resulting aqueous solution exhibits two or more of the above described corrosion rates for magnesium, aluminum, mild steel and/or brass.

In certain embodiments, when a fire-retardant composition is mixed with water at the prescribed ratio, the resulting aqueous solution meets one or more of the required criteria of U.S. Department of Agriculture, Forest Service, Specification Number 5100-304c, Long Term Retardant, Wildland Firefighting, June 2007, including all amendments.

In certain embodiments, when a fire-retardant composition is mixed with water at the prescribed ratio, the resulting aqueous solution meets one or more of the required criteria for corrosion and/or stability of U.S. Department of Agriculture, Forest Service, Specification Number 5100-304c, Long Term Retardant, Wildland Firefighting, June 2007, including all amendments.

In certain embodiments, when a fire-retardant composition is mixed with water at the prescribed ratio, the resulting aqueous solution meets all of the required criteria for corrosion of U.S. Department of Agriculture, Forest Service, Specification Number 5100-304c, Long Term Retardant, Wildland Firefighting, June 2007, including all amendments.

In certain embodiments, when a fire-retardant composition is mixed with water at the prescribed ratio, the resulting aqueous solution meets all of the required criteria for stability of U.S. Department of Agriculture, Forest Service, Specification Number 5100-304c, Long Term Retardant, Wildland Firefighting, June 2007, including all amendments.

In certain embodiments, when a fire-retardant composition is mixed with water at the prescribed ratio, the resulting aqueous solution meets all of the required criteria for corrosion and stability of U.S. Department of Agriculture, Forest Service, Specification Number 5100-304c, Long Term Retardant, Wildland Firefighting, June 2007, including all amendments.

In certain embodiments, when a fire-retardant composition is mixed with water at the prescribed ratio, the resulting aqueous solution meets all of the required criteria of U.S. Department of Agriculture, Forest Service, Specification Number 5100-304c, Long Term Retardant, Wildland Firefighting, June 2007, including all amendments.

Fire-Retardant Solutions

Provided for herein are fire-retardant solutions prepared by mixing a fire-retardant concentrate composition, as described anywhere herein, with water to form an aqueous solution. In certain embodiments, a homogenous solution is formed. In certain embodiments, the water contains low levels of bacterial contamination that can impact viscosity and/or stability by consuming biopolymers. Thus, in certain embodiments, the water contains a biocide to prevent bacterial contamination. In certain embodiments, the solution comprises insoluble components. In certain embodiments, the ratio of concentrate to water is from about 0.9 pounds to about 1.14 pounds of concentrate per 1.0 gallon of water. In certain embodiments, the ratio of concentrate to water is from about 0.9 pounds to about 1.1 pounds of concentrate per 1.0 gallon of water. In certain embodiments, the ratio of concentrate to water is from any of about 0.5, 0.6, 0.7, 0.8, 0.9, or 1.0 pounds to any of about 0.9, 1.0, 1.1, 1.14, 1.2, 1.3, 1.4, or 1.5 pounds of concentrate per 1.0 gallon of water. In certain embodiments, the ratio of concentrate to water is from any of about 0.05, 0.06, 0.07, 0.08, 0.09, 0.10, 1.11, or 0.12 kilograms to any of about 0.10, 0.11, 0.12, 0.13, 0.14, 0.15, 0.16, 0.17, 0.18, 0.19, or 2.0 kilograms of concentrate per 1.0 liter of water.

These dilution levels result in a fire-retardant solution having a lower density in comparison to state of the art fire-retardant solutions with equivalent performance characteristics, which in turn, can either reduce the weight of a fully loaded aircraft or increase the volume that an aircraft is capable of carrying. This factor can reduce the hazards associated with aerial firefighting. Further, the mix or dilution rate of the concentrate can be predetermined by evaluation of its performance in retarding the rate of flame spread and fuel consumption.

In certain embodiments, a fire-retardant solution exhibits a magnesium alloy corrosion rate equal to or less than 4.0 milli-inches per year (mpy). In certain embodiments, a fire-retardant solution exhibits a magnesium alloy corrosion rate equal to or less than 3.0 milli-inches per year. In other embodiments, a fire-retardant solution exhibits a magnesium alloy corrosion rate equal to or less than 2.0 milli-inches per year. In certain embodiments, a fire-retardant solution exhibits an aluminum corrosion rate equal to or less than 2.0 milli-inches or less than 1.0 milli-inches per year. In certain embodiments, a fire-retardant solution exhibits a mild steel corrosion rate equal to or less than 5.0 milli-inches per year. In certain embodiments, a fire-retardant solution exhibits a brass corrosion rate equal to or less than 5.0 milli-inches per year. In certain embodiments, a fire-retardant solution exhibits two or more of the above described corrosion rates for magnesium, aluminum, mild steel and/or brass.

In certain embodiments, a fire-retardant solution meets one or more of the required criteria for of U.S. Department of Agriculture, Forest Service, Specification Number 5100-304c, Long Term Retardant, Wildland Firefighting, June 2007, including all amendments.

In certain embodiments, a fire-retardant solution meets one or more of the required criteria for corrosion and/or stability of U.S. Department of Agriculture, Forest Service, Specification Number 5100-304c, Long Term Retardant, Wildland Firefighting, June 2007, including all amendments.

In certain embodiments, a fire-retardant solution meets all of the required criteria for corrosion of U.S. Department of Agriculture, Forest Service, Specification Number 5100-304c, Long Term Retardant, Wildland Firefighting, June 2007, including all amendments.

In certain embodiments, a fire-retardant solution meets all of the required criteria for stability of U.S. Department of Agriculture, Forest Service, Specification Number 5100-304c, Long Term Retardant, Wildland Firefighting, June 2007, including all amendments.

In certain embodiments, a fire-retardant solution meets all of the required criteria for corrosion and stability of U.S. Department of Agriculture, Forest Service, Specification Number 5100-304c, Long Term Retardant, Wildland Firefighting, June 2007, including all amendments.

In certain embodiments, a fire-retardant solution meets all of the required criteria of U.S. Department of Agriculture, Forest Service, Specification Number 5100-304c, Long Term Retardant, Wildland Firefighting, June 2007, including all amendments.

In certain embodiments, the fire-retardant solution exhibits a viscosity in the range of from about 150 cPs to about 1500 cPs when measured in accordance with paragraph 4.6.3.1. of Specification 5100-304c.

The disclosed solutions also exhibit low aquatic toxicity. For example, in certain embodiments, a solution exhibits an aquatic toxicity ($LC_{50}$) in the range of from about 180 milligrams per liter to about 2700 milligrams per liter. In certain embodiments, a solution exhibits an aquatic toxicity ($LC_{50}$) greater than about 180, 200, 500, 1000, 2000, or 2500 milligrams per liter. In certain embodiments, a solution exhibits an aquatic toxicity ($LC_{50}$) in the range of from any of about 180, 200, 500, 1000, 2000, or 2500 milligrams per liter to any of about 200, 500, 1000, 2000, 2500, or 2700 milligrams per liter.

In certain embodiments, a fire-retardant solution has a pH in the range of from about pH 4.0 or 5.0 to about pH 8.0. In certain embodiments, a fire-retardant solution has a pH in the range of from about pH 6.0 about pH 8.0. In certain embodiments, a fire-retardant solution has a pH in the range of from about pH 6.0 or 6.10 to about pH 7.80. In certain embodiments, a fire-retardant solution has a pH in the range of from about pH 6.0 or 6.10 to about pH 7.70. In certain embodiments, a fire-retardant solution has a pH in the range of from about pH 6.0 or 6.10 to about pH 7.60. In certain embodiments, a fire-retardant solution has a pH in the range of from about pH 6.0, 6.10 or 6.20 to about pH 7.60. In certain embodiments, a fire-retardant solution has a pH in the range of from about pH 6.20 to about pH 7.58. In certain embodiments, a fire-retardant solution has an acidic pH.

In certain embodiments, visibility of the applied solution is improved, allowing firefighting forces to draw an effective chemical fire barrier using less total solution.

Method of Making a Fire-Retardant Solution

Disclosed herein are methods of making a fire-retardant solution by mixing a fire-retardant concentrate composition described anywhere herein with water. In certain embodiments, a fire-retardant concentrate is added to water and mixed until a solution is obtained. In certain embodiments, the solution is a homogeneous solution. It is understood that the solution can include the suspension of water-insoluble components as well as water-soluble components. These are suspended in the solution dependent on the viscosity of the solution. In certain embodiments, free flowing powder and/or granules are sucked from a fluidized container into a water stream via use of an eductor mixer.

In certain embodiments, the ratio of concentrate to water is from about 0.9 pounds to about 1.14 pounds of concentrate per 1.0 gallon of water. In certain embodiments, the ratio of concentrate to water is from about 0.9 pounds to about 1.1 pounds of concentrate per 1.0 gallon of water. In certain embodiments, the ratio of concentrate to water is from any of about 0.5, 0.6, 0.7, 0.8, 0.9, or 1.0 pounds to any of about 0.9, 1.0, 1.1, 1.14, 1.2, or 1.3 pounds of concentrate per 1.0 gallon of water.

Method of Combatting a Wildfire

Disclosed herein are methods of combatting a wildfire by applying a fire-retardant solution described anywhere herein for the purpose of suppressing, containing, controlling, or extinguishing, etc., a wildfire. In certain embodiments, the fire-retardant solution is applied directly onto a flaming fuel. In other embodiments, the fire-retardant solution is applied indirectly, e.g., in front of or parallel to the moving fire front. The distance between the advancing fire and the retardant fire-break depends on the rate that the solution can be applied, the rate of spread of the moving fire front, and the presence or absence of a natural fuel break identified by changes in the geometry of the ground being threatened. In certain embodiments, the fire-retardant solution is applied from a ground platform such as a fire-engine. In certain embodiments, the fire-retardant solution is applied from an aerial platform such as a fixed-wing aircraft or a rotary-wing aircraft. In certain embodiments, the fire-retardant solution is applied from a rotary-wing aircraft such as a helicopter. In certain embodiments, the fire-retardant solution is applied from a helicopter bucket which is slung below the helicopter and in other embodiments the fire-retardant solution is contained within tanks mounted in or attached externally to the helicopter. In other embodiments, the fire retardant solution is applied from a mix of all of those listed vehicles or platforms. Obviously, the safety of the solution relative to aircraft corrosion and fouling of critical components must be greater when the solution is within or in contact with the aircraft.

EXAMPLES

Example 1

Formulations That Pass Corrosion and Viscosity Stability Requirements

TABLE 1A

| Raw Materials | B | C | F | M |
|---|---|---|---|---|
| Diammonium phosphate (DAP) | 92.83 | 92.83 | 87.29 | 82.27 |
| Monoammonium phosphate (MAP) | — | — | 5.00 | 10.00 |
| Tolyltriazole | 0.25 | 0.25 | 0.26 | 0.26 |
| Xanthan gum | 2.6 | 2.6 | 2.90 | 2.90 |
| Sodium silicofluoride | 0.84 | 0.84 | — | — |
| Sodium thiosulfate | 0.28 | 0.28 | — | — |
| Sodium molybdate dihydrate | — | — | 0.21 | 0.21 |
| Tricalcium phosphate | 2.00 | 2.00 | 2.00 | 2.00 |
| Fugitive pigment | | | 1.56 | 1.57 |
| Zinc ferrite | — | — | 0.62 | 0.63 |
| Iron oxide | 1.00 | 1.00 | — | — |
| PLURONIC ® L-101 | 0.20 | 0.20 | 0.16 | 0.16 |
| Total | 100.00 | 100.00 | 100.00 | 100.00 |
| % Nitrogen | 19.42 | 19.42 | 18.89 | 18.44 |
| % Phosphorus | 21.87 | 21.87 | 21.94 | 22.07 |
| Mix Ratio (lbs concentrate/gal water) | 1.14 | 1.14 | 1.09 | 1.08 |
| Yield ((liters/1000 kg) | 7799 | 7799 | 8116 | 8104 |
| % Ammoniacal Nitrogen in solution | 2.17 | 2.17 | 2.02 | 1.96 |
| % Phosphorus in solution | 2.45 | 2.45 | 2.35 | 2.34 |
| N/P Molar Ratio in Solution | 1.96 | 1.96 | 1.90 | 1.85 |
| DAP Equivalency | 11.1 | 11.1 | 10.8 | 10.8 |
| pH | — | — | 7.58 | 7.29 |
| Specific Gravity | — | — | 1.068 | 1.068 |
| Viscosity Stability (Required: maintain 60% or greater for 14 days) | 1-year stability | 1-year stability | 90 Day | 90 day |
| Corrosion Rate (milli-inches/year) | Pass all | Pass all | Pass all | Pass all |
| Mild Steel (max. 5.0 MPY)  RT/T | 0.1 | 0.1 | 0.1 | 0.1 |
| RT/P | 0.1 | 0.1 | 0.2 | 0.1 |
| ET/T | 0.4 | 0.4 | 0.2 | 0.2 |
| ET/P | 0.3 | 0.3 | 0.2 | 0.1 |
| Aluminum (max. 2.0 MPY)  RT/T | 0.3 | 0.3 | 0.2 | |
| RT/P | 0.2 | 0.2 | 0.3 | 0.2 |
| ET/T | 0.9 | 0.7 | 0.8 | 0.4 |
| ET/P | 0.4 | 0.4 | 1.6 | 1.4 |
| Magnesium (max. 4.0 MPY)  RT/T | 0.8 | 1.0 | 0.4 | 0.4 |
| RT/P | 0.6 | 0.8 | 0.3 | 0.3 |
| ET/T | 1.1 | 1.3 | 0.6 | 0.6 |
| ET/P | 1.0 | 1.2 | 0.5 | 0.4 |
| Brass (max. 5.0 MPY) ET/P | — | — | 0.7 | 1.0 |

For Tables 1A-1D:

RT/T refers to room temperature (70° F./21° C.) storage and T indicates total submersion of the coupon in the solution and P indicates that the coupon was partially immersed.

RT/P refers to room temperature (70° F./21° C.) storage and P indicates 50% (partial) immersion of the coupon in the solution.

ET/T refers to elevated temperature (120° F./49° C.) storage and T indicates total submersion of the coupon in the solution.

ET/P refers to elevated temperature (120° F./49° C.) storage and P indicates 50% (partial) immersion of the coupon in the solution.

TABLE 1B

| Raw Materials | A | B | J | E |
|---|---|---|---|---|
| DAP | 72.21 | 52.10 | 52.05 | 45.54 |
| MAP | 20.00 | 40.00 | 40.00 | 43.76 |
| Tolyltriazole | 0.27 | 0.28 | 0.28 | 0.27 |
| Xanthan gum | 2.90 | 2.90 | 2.95 | 2.88 |

TABLE 1B-continued

| Raw Materials | A | B | J | E |
|---|---|---|---|---|
| Sodium molybdate dihydrate | 0.21 | 0.22 | 0.22 | 0.22 |
| Tricalcium phosphate | 2.00 | 2.00 | 2.00 | 4.00 |
| Fugitive pigment | 1.61 | 1.66 | 1.66 | — |
| Fugitive pigment | — | — | — | 2.91 |
| Zinc ferrite | 0.64 | 0.67 | 0.67 | — |
| Iron oxide | — | — | — | 0.27 |
| PLURONIC ® L-101 | 0.16 | 0.17 | 0.17 | 0.15 |
| Total | 100.00 | 100.00 | 100.00 | 100.00 |
| Mix Ratio (lbs concentrate/gal water) | 1.05 | 1.01 | 1.01 | 1.03 |
| Yield ((liters/1000 kg) | 8346 | 8692 | 8784 | 8517 |
| % Ammoniacal Nitrogen in solution | 1.81 | 1.57 | 1.57 | 1.46 |
| % Phosphorus in solution | 2.31 | 2.28 | 2.28 | 2.20 |
| N/P Molar Ratio in Solution | 1.74 | 1.52 | 1.52 | 1.47 |
| DAP Equivalency | 10.7 | 10.6 | 10.6 | 10.6 |
| pH | 6.88 | 6.36 | 6.40 | 6.24 |
| Specific Gravity | 1.066 | 1.062 | 1.058 | 1.063 |
| Viscosity Stability (Required: maintain 60% or greater for 14 days) | 30 day | 30 day | 30 day | 30 day |
| Corrosion Rate (milli-inches/year) | Pass all | Pass all | Pass all | Pass all |
| Mild Steel RT/T (max. 5.0 MPY) | 0.1 | 0.2 | 0.2 | 0.2 |
| RT/P | 0.1 | 0.3 | 0.3 | 0.2 |
| ET/T | 0.3 | 0.5 | 0.6 | 0.6 |
| ET/P | 0.1 | 0.5 | 0.4 | 0.7 |
| Aluminum RT/T (max. 2.0 MPY) | 0.1 | 0.2 | 0.2 | 0.2 |
| RT/P | 0.2 | 0.2 | 0.3 | 0.2 |
| ET/T | 0.6 | 0.7 | 1.3 | 0.8 |
| ET/P | 0.9 | 0.7 | 0.8 | 1.2 |
| Magnesium RT/T (max. 4.0 MPY) | 0.7 | 0.8 | 1.0 | 1.1 |
| RT/P | 0.4 | 0.6 | 0.6 | 0.6 |
| ET/T | 1.3 | 1.7 | 2.1 | 2.5 |
| ET/P | 0.7 | 1.1 | 1.4 | 1.9 |
| Brass ET/P (max. 5.0 MPY) | 0.8 | 0.1 | 0.2 | 1.1 |

TABLE 1C

| Raw Materials | C | K | A | B |
|---|---|---|---|---|
| DAP | 46.50 | 47.03 | 47.03 | 45.03 |
| MAP | 44.68 | 45.00 | 45.00 | 46.86 |
| Tolyltriazole | 0.28 | 0.28 | 0.28 | 0.28 |
| Xanthan gum | 2.93 | 2.95 | 2.95 | 2.95 |
| Sodium molybdate dihydrate | 0.22 | 0.22 | 0.22 | 0.22 |
| Tricalcium phosphate | 2.00 | 2.00 | 2.00 | 1.25 |
| Fugitive pigment | — | 1.68 | 1.68 | — |
| Fugitive Pigment | 2.96 | — | — | 2.98 |
| Zinc ferrite | — | 0.67 | 0.67 | — |
| Iron oxide | 0.28 | — | — | 0.28 |
| PLURONIC ® L-101 | 0.15 | 0.17 | 0.17 | 0.15 |
| Total | 100.00 | 100.00 | 100.00 | 100.00 |
| Mix Ratio (lbs concentrate/gal water) | 1.01 | 1.00 | 1.00 | 1.00 |
| Yield ((liters/1000 kg) | 8692 | 8880 | 8784 | 8784 |
| % Ammoniacal Nitrogen in solution | 1.49 | 1.51 | 1.51 | 1.49 |
| % Phosphorus in solution | 2.25 | 2.27 | 2.28 | 2.28 |
| N/P Molar Ratio in Solution | 1.47 | 1.47 | 1.47 | 1.45 |
| DAP Equivalency | 10.6 | 10.6 | 10.6 | 10.6 |
| pH | 6.24 | 6.20 | 6.27 | 6.23 |
| Specific Gravity | 1.062 | 1.054 | 1.062 | 1.061 |
| Viscosity Stability (minimum required is to maintain 60% or greater for 14 days) | 30 day | 30 day | 30 day | 30 day |
| Corrosion Rate (milli-inches/year) | Pass all | Pass all | Pass all | Pass all |
| Mild Steel RT/T (max. 5.0 MPY) | 0.2 | 0.2 | 0.3 | 0.3 |
| RT/P | 0.3 | 0.3 | 0.3 | 0.3 |
| ET/T | 0.7 | 0.8 | 0.6 | 0.5 |
| ET/P | 0.7 | 0.5 | 0.5 | 0.6 |
| Aluminum RT/T (max. 2.0 MPY) | 0.2 | 0.2 | 0.2 | 0.2 |
| RT/P | 0.2 | 0.3 | 0.3 | 0.2 |
| ET/T | 0.7 | 1.0 | 0.6 | 0.6 |
| ET/P | 1.1 | 0.8 | 1.3 | 1.1 |
| Magnesium RT/T (max. 4.0 MPY) | 1.1 | 1.3 | 1.1 | 1.1 |
| RT/P | 0.7 | 0.4 | 0.1 | 0.7 |
| ET/T | 2.4 | 3.1** | 2.5 | 2.5 |
| ET/P | 1.4 | 2.2 | 1.6 | 1.5 |
| Brass ET/P (max. 5.0 MPY) | 1.0 | 0.1 | 0.1 | 0.8 |

TABLE 1D

For comparison, formulations that exhibit high corrosion rates.

| Raw Materials | H | I | A | B |
|---|---|---|---|---|
| DAP | 42.03 | 37.00 | 31.98 | 11.89 |
| MAP | 50.00 | 55.00 | 60.00 | 80.00 |
| Tolyltriazole | 0.28 | 0.28 | 0.28 | 0.29 |
| Xanthan gum | 2.95 | 2.95 | 2.95 | 2.95 |
| Sodium thiosulfate | — | 0.28 | 0.28 | 0.29 |
| Sodium molybdate dihydrate | 0.22 | 0.23 | 0.23 | 0.23 |
| Tricalcium phosphate | 2.00 | 2.00 | 2.00 | 2.00 |
| Fugitive pigment | 1.68 | 1.69 | 1.71 | 1.76 |
| Zinc ferrite | 0.67 | 0.68 | 0.68 | 0.70 |
| PLURONIC ® L-101 | 0.17 | 0.17 | 0.17 | 0.18 |
| Total | 100.00 | 100.00 | 100.00 | 100.00 |
| Mix Ratio (lbs concentrate/gal water) | 1.00 | 0.99 | 0.98 | 0.95 |
| Yield ((liters/1000 kg) | 8879 | 8879 | 8974 | 9273 |
| % Ammoniacal Nitrogen in solution | 1.47 | 1.41 | 1.35 | 1.14 |
| % Phosphorus in solution | 2.28 | 2.28 | 2.27 | 2.25 |
| N/P Molar Ratio in Solution | 1.42 | 1.37 | 1.32 | 1.12 |
| pH | 6.17 | 6.05 | 5.88 | 5.26 |
| Specific Gravity | 1.057 | 1.057 | 1.060 | 1.057 |
| Viscosity Stability (Required: maintain 60% or greater for 14 days) | 30 day | 30 day | 30 day | 30 day |
| Corrosion Rate (milli-inches/year) | Failed Mg | Failed Mg | Failed Mg | Failed Mg |
| Mild Steel RT/T (max. 5.0 MPY) | 0.2 | 0.1 | 0.2 | 1.0 |
| RT/P | 0.3 | 0.3 | 0.2 | 0.7 |
| ET/T | 1.2 | 1.2 | 0.8 | 0.6 |
| ET/P | 0.6 | 0.8 | 0.8 | 0.9 |
| Aluminum RT/T (max. 2.0 MPY) | 0.2 | 0.2 | 0.2 | 0.2 |
| RT/P | 0.3 | 0.2 | 0.3 | 0.2 |
| ET/T | 0.6 | 0.9 | 1.0 | 0.6 |
| ET/P | 0.7 | 0.8 | 0.7 | 0.5 |
| Magnesium RT/T (max. 4.0 MPY) | 1.7 | 2.0 | 2.9 | 10.3† |
| RT/P | 0.9 | 1.2 | 1.6 | 5.2† |
| ET/T | 4.3† | 6.0† | 8.7† | 12.7† |
| ET/P | 2.5 | 3.3 | 4.3† | 7.1† |
| Brass ET/P (max. 5.0 MPY) | 0.1 | 0.1 | 0.1 | 0.1 |

Based on the data presented in Tables 1A to 1D, a combination of xanthan gum and sodium molybdate provided a superior corrosion inhibitor system for MAP:DAP based fire-retardant formulations. In addition, xanthan gum thickens the retardant solution to a predetermined desirable level. The substitution of MAP for a portion of the DAP allows the preparation of fire-retardant solutions containing less total retardant concentrate and containing less ammonia per unit weight. Formulations containing the greatest amount of MAP with the ability to pass Forest Service requirements were considered the most advantageous. Certain xanthan gum thickened solutions were stable as determined by Forest Service testing when stored for one year.

Example 2

Formulations That Exhibited High Aluminum and Magnesium Corrosion Levels

TABLE 2A

| Raw Materials | | N | G | H | I | F |
|---|---|---|---|---|---|---|
| DAP | | 82.48 | 46.61 | 46.13 | 45.66 | 46.98 |
| MAP | | 10.00 | 44.79 | 44.33 | 43.86 | 45.13 |
| Tolyltriazole | | 0.26 | 0.28 | 0.28 | 0.27 | 0.28 |
| Xanthan gum | | 2.90 | 2.93 | 2.90 | 2.88 | 2.95 |
| Tricalcium phosphate | | 2.00 | 2.00 | 3.00 | 4.00 | 1.25 |
| Fugitive pigment | | 1.57 | — | — | — | — |
| Fugitive pigment | | — | 2.96 | 2.93 | 2.91 | 2.98 |
| Zinc ferrite | | 0.63 | — | — | — | — |
| Iron oxide | | — | 0.28 | 0.28 | 0.27 | 0.28 |
| PLURONIC ® L-101 | | 0.16 | 0.15 | 0.15 | 0.15 | 0.15 |
| Total | | 100.00 | 100.00 | 100.00 | 100.00 | 100.00 |
| Mix Ratio (lbs/gallon) | | 1.08 | 1.01 | 1.02 | 1.03 | 1.00 |
| Yield (liters per 1000 kg) | | 8103 | 8694 | 8604 | 8516 | 8785 |
| % Nitrogen in Solution | | 1.96 | 1.50 | 1.48 | 1.46 | 1.51 |
| % Phosphorus in Solution | | 2.35 | 2.27 | 2.24 | 2.21 | 2.28 |
| N/P Molar Ratio in Solution | | 1.85 | 1.46 | 1.46 | 1.46 | 1.46 |
| pH | | 7.27 | 6.25 | 6.25 | 6.27 | 6.24 |
| Specific Gravity | | 1.069 | 1.062 | 1.062 | 1.063 | 1.061 |
| Viscosity Stability (Required: maintain 60% or greater for 14 days) | | 30 day | 30 day | 30 day | 30 day | 30 day |
| Corrosion Rate (mils-per year (MPY)) | | Failed Al | Failed Al | Failed Al | Failed Al | Failed Al |
| Mild Steel (max. 5.0 MPY) | RT/T | 0.3 | 1.2 | 1.0 | 1.4 | 0.9 |
| | RT/P | 0.2 | 0.5 | 0.7 | 0.6 | 0.4 |
| | ET/T | 0.2 | 0.5 | 0.4 | 0.5 | 0.5 |
| | ET/P | 0.2 | 0.7 | 0.6 | 0.6 | 0.5 |
| Aluminum (max. 2.0 MPY) | RT/T | 0.6 | 0.8 | 0.8 | 0.8 | 0.1 |
| | RT/P | 0.2 | 0.4 | 0.4 | 0.4 | 0.3 |
| | ET/T | 2.7† | 2.4† | 2.4† | 2.5† | 2.3† |
| | ET/P | 1.2 | 1.0 | 1.0 | 1.0 | 1.0 |
| Magnesium (max. 4.0 MPY) | RT/T | 0.5 | 0.9 | 0.9 | 0.8 | 1.0 |
| | RT/P | 0.3 | 0.5 | 0.5 | 0.5 | 0.6 |
| | ET/T | 0.7 | 2.4 | 2.2 | 2.3 | 2.4 |
| | ET/P | 0.5 | 1.8 | 1.6 | 1.7 | 1.9 |
| Brass (max. 5.0 MPY) | ET/P | 1.1 | 0.4 | 1.0 | 0.0 | 0.2 |

For Tables 2A-2B:
RT/T refers to room temperature (70° F./21° C.) storage and T indicates total submersion of the coupon in the solution.
RT/P refers to room temperature (70° F./21° C.) storage and P indicates 50% (partial) immersion of the coupon in the solution.
ET/T refers to elevated temperature (120° F./49° C.) storage and T indicates total submersion of the coupon in the solution.
ET/P refers to elevated temperature (120° F./49° C.) storage and P indicates 50% (partial) immersion of the coupon in the solution.

TABLE 2B

| Raw Materials | H | I | A | B |
|---|---|---|---|---|
| DAP | 42.03 | 37.00 | 31.98 | 11.89 |
| MAP | 50.00 | 55.00 | 60.00 | 80.00 |
| Tolyltriazole | 0.28 | 0.28 | 0.28 | 0.29 |
| Xanthan gum | 2.95 | 2.95 | 2.95 | 2.95 |
| Sodium molybdate dihydrate | 0.22 | 0.23 | 0.23 | 0.23 |
| Tricalcium phosphate | 2.00 | 2.00 | 2.00 | 2.00 |
| Fugitive pigment | 1.68 | 1.69 | 1.71 | 1.76 |
| Zinc ferrite | 0.67 | 0.68 | 0.68 | 0.70 |
| PLURONIC ® L-101 | 0.17 | 0.17 | 0.17 | 0.18 |
| Total | 100.00 | 100.00 | 100.00 | 100.00 |
| Mix Ratio (lbs/gallon) | 1.00 | 0.99 | 0.98 | 0.95 |
| Yield (liters per 1000 kg) | 8879 | 8879 | 8974 | 9273 |
| % Nitrogen in Solution | 1.47 | 1.41 | 1.35 | 1.14 |
| % Phosphorus in Solution | 2.28 | 2.28 | 2.27 | 2.25 |
| N/P Molar Ratio in Solution | 1.42 | 1.37 | 1.32 | 1.12 |
| pH | 6.17 | 6.05 | 5.88 | 5.26 |
| Specific Gravity | 1.057 | 1.057 | 1.060 | 1.057 |
| Viscosity Stability | 30 day | 30 day | 30 day | 30 day |

TABLE 2B-continued

| Raw Materials | | H | I | A | B |
|---|---|---|---|---|---|
| (Required: maintain 60% or greater for 14 days) Corrosion Rate (mils-per year (MPY)) | | Failed Mg | Failed Mg | Failed Mg | Failed Mg |
| Mild Steel (max. 5.0 MPY) | RT/T | 0.2 | 0.1 | 0.2 | 1.0 |
| | RT/P | 0.3 | 0.3 | 0.2 | 0.7 |
| | ET/T | 1.2 | 1.2 | 0.8 | 0.6 |
| | ET/P | 0.6 | 0.8 | 0.8 | 0.9 |
| Aluminum (max. 2.0 MPY) | RT/T | 0.2 | 0.2 | 0.2 | 0.2 |
| | RT/P | 0.3 | 0.2 | 0.3 | 0.2 |
| | ET/T | 0.6 | 0.9 | 1.0 | 0.6 |
| | ET/P | 0.7 | 0.8 | 0.7 | 0.5 |
| Magnesium (max. 4.0 MPY) | RT/T | 1.7 | 2.0 | 2.9 | 10.3† |
| | RT/P | 0.9 | 1.2 | 1.6 | 5.2† |
| | ET/T | 4.3† | 6.0† | 8.7† | 12.7† |
| | ET/P | 2.5 | 3.3 | 4.3† | 7.1† |
| Brass (max. 5.0 MPY) | ET/P | 0.1 | 0.1 | 0.1 | 0.1 |

Based on the data presented in Tables 2A and 2B, solutions with sodium molybdate passed aluminum corrosion requirements. The maximum MAP concentration at which the magnesium corrosion requirement was met was between 45% and 50%, when the formulation was thickened with the amount of xanthan gum shown.

Example 3

Formulation and Corrosivity of MAP/DAP Dry Powder Retardants

N/P Molar Ratio=1.1
Mix Ratio—1.03 pounds per gallon of water.

TABLE 3A

| | Formulation No. | | | | | | | |
|---|---|---|---|---|---|---|---|---|
| | A-1 | A-2 | A-3 | A-4 | A-5 | A-6 | A-7 | A-8 |
| MAP | 81.76 | 80.52 | 78.56 | 82.97 | 81.72 | 79.76 | 79.35 | 78.73 |
| DAP | 10.09 | 9.93 | 9.69 | 10.23 | 10.08 | 9.84 | 9.80 | 9.72 |
| Xanthan gum | 3.90 | 5.30 | 7.50 | 3.90 | 5.30 | 7.50 | 7.50 | 7.50 |
| Sodium Molybdate | 0.20 | 0.20 | 0.20 | | | | 0.20 | |
| Dimercaptothiadiazole | 0.90 | 0.90 | 0.90 | | | | | 0.90 |
| Tolyltriazole | 0.25 | 0.25 | 0.25 | | | | 0.25 | 0.25 |
| Tricalcium phosphate | 1.50 | 1.50 | 1.50 | 1.50 | 1.50 | 1.50 | 1.50 | 1.50 |
| PLURONIC ® L-101 | 0.15 | 0.15 | 0.15 | 0.15 | 0.15 | 0.15 | 0.15 | 0.15 |
| Fugitive Pigment | 1.25 | 1.25 | 1.25 | 1.25 | 1.25 | 1.25 | 1.25 | 1.25 |
| Total | 100.00 | 100.00 | 100.00 | 100.00 | 100.00 | 100.00 | 100.00 | 100.00 |

For Tables 3A to 3F:

RT/T refers to room temperature (70° F./21° C.) storage and T indicates total submersion of the coupon in the solution.

RT/P refers to room temperature (70° F./21° C.) storage and P indicates 50% (partial) immersion of the coupon in the solution.

ET/T refers to elevated temperature (120° F./49° C.) storage and T indicates total submersion of the coupon in the solution.

ET/P refers to elevated temperature (120° F./49° C.) storage and P indicates 50% (partial) immersion of the coupon in the solution.

TABLE 3B

Solution Composition and Characterization @ 1.03 lbs. Per gallon mix ratio.

| | | | | | | | | |
|---|---|---|---|---|---|---|---|---|
| % Ammoniacal Nitrogen in solution | 1.21 | 1.17 | 1.12 | 1.24 | 1.21 | 1.15 | 1.14 | 1.12 |
| % Phosphorus in solution | 2.46 | 2.38 | 2.27 | 2.53 | 2.45 | 2.34 | 2.32 | 2.28 |
| N/P Molar Ratio in solution | 1.09 | 1.09 | 1.09 | 1.09 | 1.09 | 1.09 | 1.09 | 1.09 |
| 10 minute Viscosity (cps) | 335 | 710 | 1290 | 331 | 637 | 1193 | 1330 | 1310 |
| pH | 5.1 | 5.1 | 5.1 | 5.1 | 5.2 | 5.1 | 5.1 | 5.2 |
| Specific Gravity | 1.058 | 1.061 | 1.061 | 1.06 | 1.055 | 1.055 | 1.058 | 1.060 |

TABLE 3C

Steel Corrosion (max. 5.0 MPY)

| | | | | | | | | |
|---|---|---|---|---|---|---|---|---|
| RT/T | 0.2 | 0.1 | 0.1 | 2.9 | 2.7 | 1.7 | 0.3 | 0.6 |
| RT/P | 0.2 | 0.2 | 0.2 | 1.6 | 1.5 | 1.2 | 0.3 | 0.6 |
| ET/T | 0.2 | 0.2 | 0.2 | 3.5 | 2.0 | 1.9 | 1.9 | 2.0 |
| RT/T | 1.3 | 1.6 | 3.0 | 2.8 | 2.3 | 2.1 | 4.0* | 3.2* |

TABLE 3D

Aluminum Corrosion (max. 2.0 MPY)

| | | | | | | | | |
|---|---|---|---|---|---|---|---|---|
| RT/T | 0.1 | 0.1 | 0.1 | 0.5 | 0.3 | 0.3 | 0.3 | 0.1 |
| RT/P | 0.1 | 0.1 | 0.1 | 0.3 | 0.2 | 0.2 | 0.2 | 0.1 |
| ET/T | 0.3 | 0.3 | 0.3 | 0.9 | 0.6 | 0.7 | 0.6 | 0.2 |
| RT/T | 0.2 | 0.2 | 0.1 | 0.4 | 0.3 | 0.3 | 0.4 | 0.2 |

TABLE 3E

Brass Corrosion (min. 5.0 MPY)

| | | | | | | | | |
|---|---|---|---|---|---|---|---|---|
| RT/T | 0.1 | 0.0 | 0.0 | 0.1 | 0.1 | 0.1 | — | — |
| RT/P | 0.0 | 0.0 | 0.0 | 0.3 | 0.2 | 0.3 | — | — |
| ET/T | 0.1 | 0.1 | 0.1 | 2.2 | 0.9 | 0.3 | — | — |
| RT/T | 0.1 | 0.1 | 0.1 | 2.6 | 1.7 | 1.6 | — | — |

TABLE 3F

Magnesium Corrosion (max. 4.0 MPY)

| | | | | | | | | |
|---|---|---|---|---|---|---|---|---|
| RT/T | 13.5† | 13.8† | 11.6† | 17.5† | 17.8† | 20.0† | — | — |
| RT/P | 7.5† | 6.9† | 6.6† | 6.9† | 9.5† | 7.6† | — | — |
| ET/T | 28.3† | 16.5† | 13.4† | 9.1† | 8.7† | 8.0† | — | — |
| RT/T | 13.6† | 8.0† | 6.9† | 8.3† | 5.5† | 5.4† | — | — |

Example 4

Formulation and Corrosivity of MAP/DAP Dry Powder Retardants

Mix Ratio—1.03 pounds per gallon of water.

TABLE 4A

| | N/P Ratio = 1.25 | | | N/P Ratio = 1.40 | | | N/P Ratio = 1.6 | | |
|---|---|---|---|---|---|---|---|---|---|
| Formulation | B-1 | B-2 | B-3 | C-1 | C-2 | C-3 | D-1 | D-2 | D-3 |
| MAP | 67.48 | 66.46 | 64.78 | 52.52 | 51.73 | 50.48 | 33.74 | 33.23 | 32.43 |
| DAP | 25.72 | 25.34 | 24.73 | 40.43 | 39.82 | 38.87 | 59.21 | 58.32 | 56.92 |
| Xanthan gum | 3.90 | 5.30 | 7.50 | 3.90 | 5.30 | 7.50 | 3.9 | 5.30 | 7.5 |
| Tolyltriazole | | | | 0.25 | 0.25 | 0.25 | 0.25 | 0.25 | 0.25 |
| Tricalcium Phosphate | 1.50 | 1.50 | 1.50 | 1.50 | 1.50 | 1.50 | 1.5 | 1.50 | 1.5 |
| PLURONIC ® L-101 | 0.15 | 0.15 | 0.15 | 0.15 | 0.15 | 0.15 | 0.15 | 0.15 | 0.15 |
| Fugitive Pigment | 1.25 | 1.25 | 1.25 | 1.25 | 1.25 | 1.25 | 1.25 | 1.25 | 1.25 |
| Total | 100.00 | 100.00 | 99.91 | 100.00 | 100.00 | 100.00 | 100.00 | 100.00 | 100.00 |

For Tables 4A to 4E:

RT/T refers to room temperature (70° F./21° C.) storage and T indicates total submersion of the coupon in the solution.

RT/P refers to room temperature (70° F./21° C.) storage and P indicates 50% (partial) immersion of the coupon in the solution.

ET/T refers to elevated temperature (120° F./49° C.) storage and T indicates total submersion of the coupon in the solution.

ET/P refers to elevated temperature (120° F./49° C.) storage and P indicates 50% (partial) immersion of the coupon in the solution.

TABLE 4B

| Solution Composition and Characterization @ 1.03 lbs. per gallon of solution. | | | | | | | | | |
|---|---|---|---|---|---|---|---|---|---|
| % Ammoniacal Nitrogen in solution | 1.38 | 1.34 | 1.28 | 1.51 | 1.46 | 1.40 | 1.68 | 1.63 | 1.55 |
| % Phosphorus in solution | 2.48 | 2.40 | 2.29 | 2.41 | 2.34 | 2.23 | 2.35 | 2.28 | 2.17 |
| N/P Molar Ratio in solution | 1.24 | 1.24 | 1.24 | 1.39 | 1.39 | 1.39 | 1.58 | 1.58 | 1.58 |
| 10 minute Viscosity (cps) | 328 | 723 | 1350 | 307 | 757 | 1307 | 333 | 793 | 1300 |
| pH | 5.7 | 5.7 | 5.7 | 6.1 | 6.1 | 6.1 | 6.5 | 6.5 | 6.5 |
| Specific Gravity | 1.057 | 1.058 | 1.056 | 1.059 | 1.059 | 1.058 | 1.062 | 1.062 | 1.062 |

TABLE 4C

| Steel Corrosion (MPY) | | | | | | | | | |
|---|---|---|---|---|---|---|---|---|---|
| RT/T | 1.8 | 1.8* | 1.5* | 1.4 | 1.0 | 1.0 | 0.6 | 0.7 | 0.5 |
| RT/P | 1.2 | 0.9 | 0.9 | 0.8 | 0.6 | 0.6 | 0.5 | 0.4 | 0.4 |
| ET/T | 1.1 | 0.7 | 0.6 | 0.6 | 0.4 | 0.4 | 0.4 | 0.3 | 0.3 |
| RT/T | 0.9 | 0.7 | 0.7 | 0.5 | 0.4 | 0.5 | 0.4 | 0.4 | 0.3 |

TABLE 4D

| Aluminum Corrosion (MPY) | | | | | | | | | |
|---|---|---|---|---|---|---|---|---|---|
| RT/T | 0.5 | 0.5* | 0.4* | 0.7 | 0.6 | 0.5 | 0.9 | 0.8 | 0.7 |
| RT/P | 0.3 | 0.3 | 0.2 | 0.3 | 0.3 | 0.3 | 0.5 | 0.4 | 0.4 |
| ET/T | 1.2 | 1.2 | 1.1 | 1.8 | 1.7 | 1.7 | 2.4 | 2.3 | 2.2 |
| RT/T | 0.6 | 0.6 | 0.5 | 0.9 | 0.8 | 0.9 | 1.2 | 1.2 | 1.1 |

TABLE 4E

| Magnesium Corrosion (MPY) | | | | | | | | | |
|---|---|---|---|---|---|---|---|---|---|
| RT/T | 4.7 | 4.4* | 3.4* | — | — | — | — | — | — |
| RT/P | 2.4 | 2.4 | 1.9 | — | — | — | — | — | — |
| ET/T | 10.8† | 9.1† | 8.7† | — | — | — | — | — | — |
| RT/T | 6.8† | 5.6† | 4.2 | — | — | — | — | — | — |

Example 5

TABLE 5A

| Raw Materials | A 259-Fx | B Increased Conc. of xanthan gum | C Without TT-100 |
|---|---|---|---|
| DAP | 46.50 | 44.27 | 46.64 |
| MAP | 44.68 | 42.54 | 44.82 |
| Tolyltriazole | 0.28 | 0.26 | — |
| Xanthan gum | 2.93 | 7.50 | 2.93 |
| Sodium Molybdate dihydrate | 0.22 | 0.21 | 0.22 |
| Tricalcium Phosphate | 2.00 | 2.00 | 2.00 |
| Fugitive Pigment | 2.96 | 2.81 | 2.96 |
| Iron Oxide | 0.28 | 0.26 | 0.28 |
| PLURONIC ® L-101 | 0.15 | 0.15 | 0.15 |
| Total | 100.00 | 100.00 | 100.00 |
| % Nitrogen | 15.11 | 14.38 | 15.15 |
| % Phosphorus | 22.84 | 21.75 | 22.91 |
| Mix Ratio (lbs concentrate/gallon water) | 1.01 | 1.07 | 1.01 |
| Yield (liters/1000 kg) | 8692 | 8263 | 8784 |
| % Ammoniacal Nitrogen in solution | 1.49 | 1.42 | 1.50 |
| % Phosphorus in solution | 2.25 | 2.15 | 2.27 |
| N/P Molar Ratio in solution | 1.46 | 1.46 | 1.46 |
| 10 minute viscosity (cP) | 360 | 1613 | 370 |
| 24 hour viscosity (cP) | 367 | 1630 | 370 |
| pH | 6.28 | 6.27 | 6.27 |
| Specific Gravity | 1.056 | 1.055 | 1.059 |
| Viscosity Stability (Required to maintain 60% or greater for 14 days) | Pass 30 Day | Pass 30 Day | Pass 30 Day |
| Corrosion (milli-inches/year) | Pass all | Pass all | Pass all |
| Mild Steel (max. 5.0 MPY) RT/T | 0.3 | 0.3 | 0.2 |
| RT/P | 0.3 | 0.3 | 0.3 |
| ET/T | 0.8 | 0.4 | 1.1 |
| ET/P | 0.7 | 0.6 | 0.6 |
| Aluminum (max. 2.0 MPY) RT/T | 0.2 | 0.2 | 0.2 |
| RT/P | 0.2 | 0.2 | 0.2 |
| ET/T | 0.9 | 0.6 | 0.8 |
| ET/P | 1.4 | 1.2 | 1.2 |
| Magnesium (max. 4.0 MPY) RT/T | 0.8 | 0.9 | 0.7 |
| RT/P | 0.7 | 0.6 | 0.7 |
| ET/T | 2.3 | 2.1 | 2.3 |
| ET/P | 1.3 | 1.4 | 2.1 |
| Brass (max. 5.0 MPY) ET/P | 1.5 | 1.2 | 2.2 |

Tables 5A and 5B.

RT/T refers to room temperature (70° F./21° C.) storage and T indicates total submersion of the coupon in the solution.

RT/P refers to room temperature (70° F./21° C.) storage and P indicates 50% (partial) immersion of the coupon in the solution.

ET/T refers to elevated temperature (120° F./49° C.) storage and T indicates total submersion of the coupon in the solution.

ET/P refers to elevated temperature (120° F./49° C.) storage and P indicates 50% (partial) immersion of the coupon in the solution.

TABLE 5B

| Raw Materials | | D 55% MAP/ 45% DAP | E 65% MAP/ 35% DAP | F Diutan Gum |
|---|---|---|---|---|
| DAP | | 41.01 | 31.90 | 47.10 |
| MAP | | 50.13 | 59.24 | 45.26 |
| Tolyltriazole | | 0.28 | 0.28 | 0.28 |
| Xanthan gum | | 2.95 | 2.95 | — |
| Diutan Gum | | — | — | 1.75 |
| Sodium Molybdate dihydrate | | 0.22 | 0.22 | 0.22 |
| Tricalcium Phosphate | | 2.00 | 2.00 | 2.00 |
| Fugitive Pigment | | 2.98 | 2.98 | 2.96 |
| Iron Oxide | | 0.28 | 0.28 | 0.28 |
| PLURONIC ® L-101 | | 0.02 | 0.15 | 0.15 |
| Total | | 100.00 | 100.00 | 100.00 |
| % Nitrogen | | 14.65 | 13.91 | 15.30 |
| % Phosphorus | | 23.02 | 23.34 | 23.14 |
| Mix Ratio (lbs concentrate/ gallon water) | | 1.00 | 0.99 | 1.01 |
| Yield (liters/1000 kg) | | 8784 | 8880 | 8692 |
| % Ammoniacal Nitrogen in solution | | 1.43 | 1.35 | 1.53 |
| % Phosphorus in solution | | 2.25 | 2.26 | 2.31 |
| N/P Molar Ratio in solution | | 1.41 | 1.32 | 1.46 |
| 10 minute viscosity (cP) | | 373 | 370 | 160 |
| 24 hour viscosity (cP) | | 357 | 353 | 390 |
| pH | | 6.17 | 5.95 | 6.21 |
| Refractive Index | | 10.5 | 10.5 | 10.5 |
| Specific Gravity | | 1.056 | 1.054 | 1.057 |
| Viscosity Stability (Required to maintain 60% or greater for 14 days) | | Pass 30 Day | Pass 30 Day | Pass 30 Day |
| Corrosion (milli-inches/year) | | Pass all | Failed Mg | Pass all |
| Mild Steel (max. 5.0 MPY) | RTT | 0.2 | 0.7 | 0.3 |
| | RTP | 0.4 | 0.7 | 0.3 |
| | ETT | 0.9 | 1.1 | 1.0 |
| | ETP | 0.7 | 1.0 | 0.6 |
| Aluminum (max. 2.0 MPY) | RTT | 0.2 | 0.2 | 0.2 |
| | RTP | 0.2 | 0.2 | 0.2 |
| | ETT | 0.8 | 0.6 | 1.2 |
| | ETP | 1.2 | 1.0 | 1.5 |
| Magnesium (max. 4.0 MPY) | RTT | 1.1 | 1.8 | 1.0 |
| | RTP | 0.8 | 1.0 | 0.7 |
| | ETT | 2.8 | 4.7† | 2.4 |
| | ETP | 1.6 | 2.7 | 1.5 |
| Brass (max. 5.0 MPY) | ETP | 1.2 | 1.2 | 1.2 |

Based on the data presented in Tables 5A and 5B:
1. Increasing the concentration of xanthan gum does not further improve the stability or corrosion rates.
2. Formulation without tolytriazole increased the brass corrosion rate by 0.8 MPY (mils-per-year) when compared to the with tolytriazole. Both the formulations met the requirement (maximum of 5.0 MPY).
3. Data also shows that changing the ratio of the salts from 49%MAP/51% DAP to 55%MAP/45%DAP in 259-Fx meets all USFS requirements.
4. Using diutan gum instead of xanthan gum meets all USFS requirements.

* * *

The breadth and scope of the present disclosure should not be limited by any of the above-described exemplary embodiments, but should be defined only in accordance with the following claims and their equivalents.

APPENDIX A

UNITED STATES DEPARTMENT OF
AGRICULTURE FOREST SERVICE

SPECIFICATION FOR LONG TERM
RETARDANT, WILDLAND FIREFIGHTING 5100-304c
Amendments Inserted May 17, 2010
Jun. 1, 2007
Superseding
Specification 5100-304b
January 2000

1. GENERAL.
  1.1. Scope. The long-term fire retardants described in this specification are for use in wildland fire management. They may be applied from aerial or ground application equipment.
    After mixing with water in the prescribed ratio, the mixed retardant is applied to slow the spread and reduce the intensity of the fire.
    Long-term retardants continue to be effective after the contained water has evaporated.
  1.1.1. Long-term retardant concentrates may be wet or dry.
  1.1.2. Products must be one component, i.e., mixed retardants shall be prepared by blending a single concentrate with water.
  1.1.3. The mix ratio shall be specified by the manufacturer and confirmed by combustion-retarding effectiveness testing. Refer to 3.6 for additional information.
2. SUBMISSION AND EVALUATION.
  2.1. Wildland Fire Chemical Product Qualification Testing. Qualification testing for wildland fire chemical products shall be performed prior to use (Forest Service Manual (FSM) 5100, Chapter 5160, Section 5162).
    Testing shall include a laboratory evaluation and may include a field evaluation during firefighting operations.
  2.2. Unacceptable ingredients. In addition to the ingredients identified in 2.4.1 as not meeting Forest Service direction the following ingredients shall not be accepted.
    Sodium ferrocyanide (Yellow Prussiate of Soda or YPS)
    Dichromates
    Thiourea
    Borate or other boron-containing compounds
    Polychlorinated biphenols (PCB) [Amendment 2 adds additional ingredients to list.]
    Polybrominated diphenyl ethers (PBDE) [Amendment 2 adds additional ingredients to list.]
  2.3. Manufacturer Submission Process. The submitter (manufacturer, distributor, or supplier) shall make a request for evaluation to the USDA Forest Service, Branch Chief for Fire Equipment and Chemicals.
  2.3.1. The following documents describing the submission procedures, evaluation process, and the required performance for acceptable products are available on the internet at www.fs.fed.us/rm/fire/wfcs/lt-ret.htm:

The Manufacturers Submission Procedures for Qualification Testing of Long-Term Retardant Products, This Specification and current amendments, Standard Test Procedures for the Evaluation of Wildland Fire Chemical Products.

2.3.1.1 Paper copies of these documents can be obtained from the Program Leader or Project Leader, Wildland Fire Chemical Systems (WFCS), 5785 Highway 10 West, Missoula, Mont., 59808, if web access is unavailable.

2.3.1.2 Terms and Definitions. A list of terms used in this specification and their definitions can be found in Section 6.

2.3.1.3 Sources of Reference Materials. A list of sources for obtaining all referenced standards and test methods in this specification can be found in Section 7.

2.3.2. Classification. The submitter shall specify the classifications of the wildland fire chemical product, according to Sections 2.3.2.1 through 2.3.2.5, for which qualification is sought.

The evaluation shall be conducted following the test methods and requirements contained in this specification, based on the classifications requested by the submitter.

2.3.2.1 Application Methods. Each mixed product shall be classified based on the listed application methods.

HF Helicopters having a fixed tank, either internal or external in direct contact with the helicopter.

FW/Multi-Engine Fixed-wing (all delivery systems) land-based, multi-engine aircraft having a tank and delivery system for aerial application of wildland fire chemicals.

FW/Single-Engine Fixed-wing (all delivery systems) land-based, single-engine (SEAT) aircraft having a tank and delivery system for aerial application of wildland fire chemicals.

HB/G Helicopters having a bucket suspended below the helicopter such that no chemical is likely to contact the helicopter during normal fire operations and all ground-based application equipment, such as wildland engines, portable pumps, and other such devices.

2.3.2.2 Form of concentrate. Each concentrate shall be classified as wet or dry.

Dry Concentrate A single, dry component which is mixed with water to prepare the mixed product.

Wet Concentrate A single, liquid component which is mixed with water to prepare the mixed product.

2.3.2.3 Storability. All concentrates shall be evaluated as storable products.

Each mixed product shall be classified to indicate the type and length of storage the product is designed for and whether or not recirculation is required or recommended.

Storable Concentrate is stable for at least 52 weeks. The mixed product is stable for at least 52 weeks. [Amendment 3 adds clarification.]

Products may be recirculated in storage and recirculation may be required to obtain a homogeneous and usable product.

Not Storable Concentrate is stable for at least 52 weeks. Mixed product is stable for at least 14 days. [Amendment 3 adds clarification.]

Products are mixed or blended during transfer to aircraft or other application devices. Minimal additional mixing or recirculation is necessary.

These products are not routinely stored in the mixed form except in application equipment where recirculation is not available.

2.3.2.4 Color. Each mixed product shall be classified as uncolored, iron oxide colored, or fugitive colored, as described below. All products qualified and approved for aerial application of any type shall be either iron oxide colored or fugitive colored. [Amendment 1 clarifies the intent of section 2.3.2.4.]

Uncolored A mixed product that contains no ingredients that impart color. The product in the container may have some earth-tone color; however it is not visible when applied to natural fuels.

Fugitive Colored A mixed product that contains one or more ingredients that impart a high degree of visibility from the air when first applied to wildland fuels but will lose visibility gradually over several months.

Iron Oxide Colored A mixed product that contains at least 12 grams of iron oxide per gallon to impart red color to provide a high degree of visibility from the air at the time of application to wildland fuels.

2.3.2.5 Viscosity Range. Each mixed product shall be classified based on the viscosity of the product.

Mixed products must achieve the desired viscosity by hydration of an appropriate amount of guar gum, guar gum derivatives, xanthan, or other thickeners that imparts elasticity as well as viscosity.

High Viscosity Mixed product with a viscosity between 801 and 1500 centipoise (cP).

Medium Viscosity Mixed product with a viscosity between 401 and 800 cP.

Low Viscosity Mixed product with a viscosity between 101 and 400 cP.

2.3.2.6 Base Type. The evaluation shall be conducted following the test methods and requirements contained in this specification, based on the classifications shown above.

Approvals for use from specific base types shall be determined by product performance and mixing and storage needs.

Permanent Storable mixed products or not storable mixed products made from wet concentrates are suitable.

Recirculation is possible, large/long-term storage capability, and auxiliary equipment are readily available.

Temporary/Mobile Not storable mixed products are suitable; storable products may be suitable.

Small volumes of mixed product storage capability and limited auxiliary equipment, including recirculation, are available.

2.3.3. Collection Agreement and Test Fee. A Collection Agreement between the Forest Service, Missoula Technology and Development Center (MDTC)-WFCS and the submitter will be prepared. This document describes the roles and responsibilities of the Forest Service, WFCS laboratory personnel, and the submitter.

Specific information in the agreement includes a list of authorized contacts for the Forest Service and for the submitter, as well as an estimate of the cost and time required for the evaluation.

2.3.4. Product Information. All product information described below shall be provided to the Forest Service and reviewed by the designated agency representative, as summarized in 2.4 and described in "Manufacturer Submission Procedures for Qualification Testing of Long-Term Retardant Products," prior to acceptance of samples for testing.

2.3.4.1 Proprietary Information. The formulation disclosure and other product information provided to the Forest Service as a part of the submission process will be maintained within the WFCS Program for use during the evaluation process.

All proprietary or sensitive information is kept in a locked file accessible only to the Program Leader and Project Leader of WFCS.

Occasionally information will be provided in response to inquiries from the Director of Fire and Aviation, the Branch Chief for Equipment and Chemicals or their staffs.

2.3.4.2 Access to Information Under the Freedom of Information Act. Information provided to the Forest Service as part of the product submission is subject to the Freedom of Information Act (FOIA), 5 U.S.C., Section 552.

Confidential and trade secret information shall not be disclosed if determined to be exempt under FOIA.

The results of the testing performed by the Forest Service may be disclosed under some circumstances.

2.3.4.3 Formulation Disclosure Sheet. The submitter shall submit a Formulation Disclosure Sheet (Table 1 of Manufacturer Submission Procedures) that includes the required information on all ingredients contained in the formulation.

Full disclosure of the types and amounts of each chemical in the product, the Chemical Abstract Services (CAS) number, quality or grade, and manufacturer shall be included for each ingredient.

The manufacturing process, manufacturing site, and other information that the supplier considers significant about each ingredient should also be provided. [Amendment 3 adds manufacturing site to the list of information to be provided.]

2.3.4.4 Mix Ratio. The submitter shall specify the mix ratio for which the product is designed and qualification is being sought.

2.3.4.5 Health and Safety Information. The submitter shall provide the following safety information to the Forest Service for review, prior to shipping the product:
a. Mandatory: Material Safety Data Sheet (MSDS) for the proposed product.
b. Mandatory: MSDS for each ingredient of the proposed product.
c. Optional: Summary of any toxicity or related safety test results conducted by or for the manufacturer prior to submission to the Forest Service.

2.3.4.6 Technical Data Sheet. The submitter shall provide a completed Technical Data Sheet (Tables 2 and 3 of Manufacturer Submission Procedures) giving all required information on the physical properties and characteristics of the product.

A description of field mixing and handling requirements shall be included.

2.3.4.7 Other Technical Information. The submitter shall provide information regarding laboratory mixing, field mixing and handling, and any special cleanup procedures that may be of use to the laboratory personnel at WFCS.

2.3.4.8 Patents. Copies of patents covering any aspect of the formulation or its application in wildland fire operations should be included in the submission documentation.

2.4. Review Prior to Product Submittal (STP-1.1). The Project Leader, WFCS shall review the documentation package for completeness and consistency. Any questions that may arise shall be resolved at that time.

2.4.1. Chemicals of Concern. A review of environmental regulations as they apply to the formulation and the ingredients of the formulation shall be completed at the same time. Specifically, the status of each chemical with regard to the regulatory lists shown below shall be determined.

a. 40 Code of Federal Regulations (CFR) 355 Appendix A.—Comprehensive Environmental Response, Compensation, and Liability Act (CERCLA), List of Extremely Hazardous Substances and Their threshold Planning Quantities.
b. National Toxicology Program's Annual Report on Carcinogens.
c. International Agency for Research on Cancer (IARC) Monographs for Potential Carcinogens.
d. 40 CFR 302.4.—CERCLA, List of Hazardous Substances and Reportable Quantities.
e. 40 CFR 261.33.—Resources Conservation and Recovery Act (RCRA), Acutely Hazardous and Toxic Wastes.
f. 40 CFR 372.—Superfund Amendment and Reauthorization Act (SARA) Title III, sec 313, Emergency Planning and Community Right to Know (EPCRA), Toxic Release Inventory (TRI).

2.4.2. Chemical Profile and/or Risk Assessment. If any of the ingredients trigger concern, a basic chemical profile and/or a risk assessment may be required before further action is taken on the formulation evaluation.

The Forest Service shall make a written notification to the submitter of these concerns and include the acceptable remedies and the associated costs. The submitter has the choice to continue or not at this point, and shall be asked to notify the Forest Service in writing of that decision.

If required, this risk assessment shall be performed by the Forest Service or an approved third-party selected by the Forest Service, using accepted methodology. All costs associated with the additional work shall be the responsibility of the submitter.

2.5. Submission of Samples for Laboratory Evaluation. When requested, and at no cost to the Forest Service, the submitter shall provide the required amount of concentrate for use in the laboratory evaluation tests.

2.5.1. Packaging. The packaging of all wildland fire chemicals submitted for evaluation shall conform to regulations governing the ground and air transport of materials.

The concentrates, in the quantities shown, shall be packaged as specified in Table A.

TABLE A

Test sample quantity and packaging. [Amendment 3 increases the volume of product required.]

| Product Type | Packaging | Quantity |
| --- | --- | --- |
| Dry concentrate | 5-gallon (18.9 liter) Plastic Pails with Removable Lids | 20 Pails Each containing the amount of concentrate to be added to 25 gallons (95 liters) of water |
| Wet concentrate | 5-gallon (18.9 liter) Plastic Pails with Removable Lids | 225 gallons (852 liters) in pails weighing ≤ 50 lbs (22.7 kg) each |

Note:
Based on specific product information, the Project Leader may specify a different amount of product than shown here.

2.5.2. Marking. Individual containers of products submitted for evaluation shall be legibly marked in accordance with Federal Standard 123.

Labeling shall comply with Department of Transportation, Occupational Safety and Health Administration, and applicable State and Local requirements and in addition shall include the following:

a. Manufacturer's name or trademark.

b. Product identification, including formulation codes and production information codes.

c. Volume of concentrate (weight in the case of a dry concentrate) per container.

d. Month and year of submission.

2.5.3. Shipping. The laboratory test sample shall be shipped at the submitter's expense to WFCS at MTDC in Missoula, Mont.

The complete address shall be provided as part of the shipping instructions when the product is requested.

An MSDS for the product shall accompany the shipment.

If the product is imported, the supplier shall be responsible for the entire process necessary to deliver the product to the test laboratory. [Amendment 3 adds clarification of responsibilities.]

3. REQUIREMENTS.

3.1. Evaluation Samples and Mix Ratio. The evaluation shall be conducted on the concentrate and on the mixed product prepared using the manufacturers' recommended mix ratio or other mix ratio as described below.

If the manufacturers' recommended mix ratio meets the listed criteria in Section 3.5.2, then no burn testing is required; for all other cases, the mix ratio shall be confirmed by combustion-retarding effectiveness testing and if adjusted, agreed to by the submitter.

The mixed product prepared using the mix ratio agreed to by the submitter and WFCS shall be used throughout this evaluation.

3.2. Performance Information. The properties and characteristics of the concentrates and mixed products may vary over a wide range of values. For some tests, a specific result is not required for qualification.

All listed tests, including those for which no required performance level is given, shall be performed and reported for information.

The performance information developed will be provided to user agencies as input to their procurement and decision-making processes.

3.2.1. Modifications and Changes to Requirements. At a later date some or all of these requirements may be amended to include limits to the performance values.

3.3. Determination of Laboratory Mixing Procedures. In accordance with 4.2, a suitable set of conditions and methods for preparing laboratory samples of the mixed product shall be determined.

This procedure shall be used to prepare all samples for the laboratory evaluation.

3.4. Health and Safety.

3.4.1. Mammalian Toxicity and Irritation Tests. As required by 3.4.1.1 and 3.4.1.2, the mammalian toxicity and irritation performance of the concentrate and mixed product shall be determined in accordance with 4.3.

The results will be made available to users as performance information.

3.4.1.1 Concentrate. The toxicity of the wet or dry concentrate shall meet the requirements in Table B when tested in accordance with 4.3.

TABLE B

Toxicity and irritation requirements for wet or dry concentrate.

| Test | Requirement |
| --- | --- |
| Acute oral toxicity | $LD_{50}$ > 500 mg/kg. |
| Acute dermal toxicity | $LD_{50}$ > 2000 mg/kg. |
| Primary eye irritation for washed and unwashed eyes | Mildly irritating or less. If more irritating, recommend protective gear and safe handling procedures. |
| Primary dermal irritation | Primary irritation index < 5.0. If more irritating, recommend protective gear and safe handling procedures. |

3.4.1.1.1 Review of Mammalian Toxicity and Irritation Test Results. When the test results for a concentrate indicate that protective gear and safe handling procedures are needed, the manufacturer shall make recommendations to be added to the product label and the Material Safety Data Sheet (MSDS).

In accordance with 4.3.2, the results and related recommendations shall be reviewed by the Program Leader and Project Leader, WFCS, and approved as appropriate.

For unusual situations, the Safety and Health Branch of the Forest Service, Washington Office will be contacted for technical assistance.

3.4.1.1.2 Mixed Product. The toxicity of the mixed product shall meet the requirements in Table C when tested in accordance with 4.3.

TABLE C

Toxicity and irritation requirements for mixed product.

| Test | Requirement |
| --- | --- |
| Acute oral toxicity | $LD_{50}$ > 5000 mg/kg. |
| Acute dermal toxicity | $LD_{50}$ > 2000 mg/kg. |
| Primary eye irritation for washed and unwashed eyes | Mildly irritating or less. |
| Primary dermal irritation | Primary irritation index < 5.0. |

3.4.2. Fish Toxicity. The $LC_{50}$ for rainbow trout exposed to the concentrate shall be greater than 100 mg/L when tested in accordance with 4.4.

The results will be made available to users as performance information.

3.5. Combustion-Retarding Effectiveness. All mixed retardants shall meet the criteria in 3.5.1.

All mixed retardants shall meet the requirements of 3.5.2 or 3.5.3.

3.5.1. Retarding Salts. All products shall use one or a combination of diammonium phosphate, monoammonium phosphate, or ammonium polyphosphate (10-34-0 or 11-37-0) to impart combustion retarding effectiveness.

3.5.2. Required Retarding Salt Concentration. A product containing one of the following retarding salts or mixtures of salts at or greater than the listed concentrations shall not require a burn test.

The salt concentration shall be verified by chemical analysis during the evaluation.

a. Diammonium phosphate (DAP), industrial grade or better (21-53-0), in the mixed retardant at a concentration of 10.6 percent or greater.

Fertilizer grade and other lower grades shall be burn tested to establish an acceptable mix ratio.

b. Monoamonium phosphate (MAP), industrial grade or better (12-62-0), in the mixed retardant at a concentration of 9.2 percent or greater.
   Fertilizer grade and other lower grades shall be burn tested to establish an acceptable mix ratio.
c. $P_2O_5$ in fertilizer grade ammonium polyphosphates (APP; 10-34-0 or 11-37-0) in the mixed retardant at a concentration of 8.0 percent or greater ortho phosphate.
d. Combinations of DAP and MAP, industrial grades or better, having a total of 10.6 percent DAP (21-53-0) equivalents or greater using the conversions described below.
   Use the DAP concentration without conversion.
   Use the MAP concentration multiplied by 1.15.
e. Fertilizer grade DAP or MAP, alone or in combination shall require a burn test.

3.5.3. Combustion-Retarding Effectiveness Test. When a mixed retardant does not meet one of the criteria in 3.5.2, the product shall undergo a fire effectiveness test in accordance with 4.5.
   A reduction index greater or equal to the reduction index of the standard chemical, 10.6-percent DAP, shall be acceptable.

3.6. Physical Properties. In accordance with 4.6, the physical properties of the dry and wet concentrate and all mixed retardants shall be determined as specified in 3.6.1, 3.6.2, and 3.6.3.
   These test results shall define the standard characteristics for the submitted product and be used to address quality issues.
   The results will be made available to users as performance information.

3.6.1. Physical Properties of the Dry Concentrate. In accordance with 4.6, the retarding salt content of the dry concentrate shall be determined.
   The values determined shall be used as baseline values for stability tests as required in 3.9. The results will be made available to users as performance information.

3.6.2. Physical Properties of the Wet Concentrate. In accordance with 4.6, the retarding salt content, viscosity, density, and pH of the wet concentrate shall be determined.
   The values determined shall be used as baseline values for stability tests as required in 3.9.
   The results will be made available to users as performance information.

3.6.3. Physical Properties of the Mixed Retardant. In accordance with 4.6, the retarding salt content, the refractometer reading, steady-state viscosity, density, and pH of the mixed retardant shall be determined.
   The values determined shall be used as baseline values for stability tests as required in 3.9.
   The results will be made available to users as performance information.

3.6.3.1 Retarding Salt Content. When tested in accordance with 4.6.1 the retarding salt content shall meet the requirements of 3.5.2 or 3.5.3.
   The results will be made available to users as performance information.

3.6.3.2 Steady State Viscosity. When tested in accordance with 4.6.3.1, the steady state viscosity shall meet the requirements of the classification for which the product was submitted.
   The results will be made available to users as performance information.

3.7. Materials Effects. As required by 3.7.1 through 3.7.4, the effects of the wet concentrate and mixed retardant on metallic and non-metallic materials shall be determined in accordance with 4.7.
   The results will be made available as performance information.

3.7.1. Uniform Corrosion. When tested in accordance with 4.7.1, wet concentrate and freshly prepared mixed retardant shall not have corrosion rates exceeding those shown in Table D for the alloys listed.

3.7.2. Intergranular Corrosion. When tested in accordance with 4.7.2, the alloys specified in 3.7.2.1 through 3.7.2.4 shall show no evidence of intergranular corrosion.

3.7.2.1 Helicopter Fixed Tank. When tested in accordance with 4.7.2, coupons made of alloy 2024-T3 aluminum and Az-31B magnesium shall not exhibit intergranular corrosion following exposure to mixed retardant during the uniform corrosion tests.

3.7.2.2 Multi-Engine, Fixed-Wing Air Tanker. When tested in accordance with 4.7.2, coupons made of alloy 2024-T3 aluminum shall not exhibit intergranular corrosion following exposure to mixed retardant during the uniform corrosion tests.

3.7.2.3 Single-Engine, Fixed-Wing Air Tanker. When tested in accordance with 4.7.2, coupons made of alloy 2024-T3 aluminum shall not exhibit intergranular corrosion following exposure to mixed retardant during the uniform corrosion tests.

3.7.2.4 Helicopter Bucket and Ground Based Application Equipment. There are no intergranular corrosion requirements for helicopter bucket.

TABLE D

Maximum Allowable Corrosion Rates (mils-per-year) for Wildland Fire Chemical Products.[1]

| | 2024-T3 Aluminum | | 4130 Steel | | Yellow Brass | Az31B Magnesium | |
|---|---|---|---|---|---|---|---|
| | Total | Partial | Total | Partial | Partial | Total | Partial |
| | | | | Temperature: °F. | | | |
| | 70  120 | 70  120 | 70  120 | 70  120 | 120 | 70  120 | 70  120 |
| | | | | mils-per-year | | | |
| Concentrates | | | | | | | |
| Wet concentrates for fixed-tank helicopters | 5.0  5.0 | 5.0  5.0 | 5.0  5.0 | 5.0  5.0 | 5.0 | 5.0  5.0 | 5.0  5.0 |
| Wet concentrates[2] except fixed-tank helicopters | 5.0  5.0 | 5.0  5.0 | 5.0  5.0 | 5.0  5.0 | 5.0 | | |

TABLE D-continued

Maximum Allowable Corrosion Rates (mils-per-year) for Wildland Fire Chemical Products.[1]

| | 2024-T3 Aluminum | | 4130 Steel | | Yellow Brass | | Az31B Magnesium | |
|---|---|---|---|---|---|---|---|---|
| | Total | Partial | Total | Partial | Partial | | Total | Partial |
| | | | | Temperature: °F. | | | | |
| | 70  120 | 70  120 | 70  120 | 70  120 | 120 | | 70  120 | 70  120 |
| | | | | mils-per-year | | | | |
| Mixed Products | | | | | | | | |
| Fixed-tank helicopters[3] | 2.0  2.0 | 2.0  2.0 | 5.0  5.0 | 5.0  5.0 | 5.0 | | 4.0  4.0 | 4.0  4.0 |
| Fixed-wing air tankers[4] | 2.0  2.0 | 2.0  2.0 | 5.0  5.0 | 5.0  5.0 | 5.0 | | | |
| Helicopter bucket and[2] Ground-based application | 2.0  2.0 | 2.0  2.0 | 5.0  5.0 | 5.0  5.0 | 5.0 | | | |

[1] All uniform corrosion rates shall be determined by 90-day weight loss tests. All uniform corrosion rates are the maximum allowable average of all replicates.
[2] Magnesium uniform corrosion tests shall be performed for performance information. Intergranular corrosion tests are not required on aluminum or magnesium.
[3] Intergranular corrosion tests shall be performed on aluminum and magnesium coupons; no intergranular corrosion is allowed.
[4] Intergranular corrosion tests shall be performed on aluminum coupons; no intergranular corrosion is allowed. Magnesium uniform corrosion tests shall be performed for performance information. Intergranular corrosion tests are not required on magnesium.

3.7.3. Effects of Concentrate and Mixed Product on Non-Metallic Materials. In accordance with 4.7.3, the wet concentrates and all mixed retardants shall be tested to determine their effect on the non-metallic materials listed in Table E and their ability to meet the requirements of 3.7.3.1.

TABLE E

Materials to be tested to determine the effect of exposure to wet concentrate and/or mixed retardant.

| Material | Material Specification |
|---|---|
| Shall Be Tested And Performance Provided To User Agencies. | |
| Chloroprene rubber | AMS 3208M |
| PVC Plastic, Flexible | MIL A-A-55859A |
| Sealant | AMS S-8802 |
| Fiberglass/Epoxy Resin | AMS C-9084 |
| High-Density Polyethylene | ASTM D 4976 |
| Low-Density Polyethylene | ASTM D 4976 |
| Sealant | MIL PRF-81733D |
| Flexible Cross-Linked Polyolefin | AMS DTL-23053/5 |

3.7.3.1 Effect of Exposure to Wet Concentrate and Mixed Product on Non-Metallic Materials. When tested as required in 3.7.3, the changes in hardness and volume of each of the materials listed in Table 5 shall be determined. All results shall be reported to user agencies as performance information.

| Characteristics | Reportable Change |
|---|---|
| Hardness | ≤10-percent decrease |
| Hardness | ≤20-percent increase |
| Volume | ≤0.5 mL from initial |

3.7.4. Abrasion. When tested in accordance with 4.7.4, all wet concentrates and mixed retardants prepared from dry concentrates, shall be tested for the abrasiveness of the retardant to aluminum 2024-T3.
  Total abrasion of the disc and the wear plate shall not exceed 0.010 inch (0.25 mm), when rotated at 1800 rpm for 50 hours.
3.8. Pumpability. When tested in accordance with 4.8 the pumpability of all wet concentrates and mixed retardants prepared from dry concentrates shall be determined. A minimum flow rate of 18 gallons (68.1 liters) per minute is required.
3.9. Product Stability. When tested in accordance with 3.9, concentrates and mixed retardants shall meet all applicable requirements of 3.9.1 through 3.9.3.
3.9.1. Outdoor Storability. When tested in accordance with 4.9.1, the concentrate and mixed products shall meet all applicable requirements of 3.9.1.1 and 3.9.1.2.
3.9.1.1 Concentrates. All concentrates shall meet the requirements of either 3.9.1.1.1 or 3.9.1.1.2.
3.9.1.1.1 Dry Concentrates. In accordance with 4.9.1.1.1, dry concentrates shall be stored outdoors for 52 weeks.
  The stored concentrate shall have no visual separation such as discoloration or caking. Lumps shall fit through a 0.25-inch (0.625 cm) sieve-size.
  The stored concentrate shall be used to prepare mixed retardant as required in 3.9.1.1.3.
3.9.1.1.2 Wet Concentrates. In accordance with 4.9.1.1.2, wet concentrates shall be stored outdoors for 52 weeks.
  There shall be no separation resulting in particles larger than 0.25-inch (0.625 cm) sieve-size. The stored concentrate shall be tested to determine the following properties:
  a. Viscosity, in accordance with 4.6.3,
  b. Density, in accordance with 4.6.4, and
  c. pH, in accordance with 4.6.5.
  The stored concentrate shall be used to prepare mixed retardant as required in 3.9.1.1.3. The results will be made available to users as performance information.
3.9.1.1.3 Mixed Retardant from Stored Concentrate. As required by 3.9.1.1.1 and 3.9.1.1.2, the mixed retardant shall be prepared from the stored concentrate and tested as required in 3.9.1.1.4 through 3.9.1.1.6.
3.9.1.1.4 Physical Properties of Mixed Retardant from Stored Concentrate. The mixed retardant, prepared as required in 3.9.1.1.3, shall be tested to determine the following properties:
  a. Viscosity, in accordance with 4.6.3,
  b. Density, in accordance with 4.6.4, and
  c. pH, in accordance with 4.6.5.
  These values shall be within the allowable variation, as shown in Table F, from the original values, determined in 3.6.2, for the initial values for the mixed retardant prepared from fresh concentrate. [Amendment 3 adds clarification.]

The results will be made available to users as performance information.

TABLE F

Allowable Variation of Physical Properties of Mixed Retardant Prepared from Concentrate Stored for 52 weeks.

| Property | Allowable Variation from Initial Value |
| --- | --- |
| Steady-State Viscosity | ±15 percent |
| Density | ±1 percent |
| pH | ±0.75 units |

3.9.1.1.5 Stability of Mixed Retardant from Stored Concentrate. The mixed retardant, prepared as required by 3.9.1.1.3, shall be stored outdoors for 14 days, in accordance with 4.11.1.2, for freshly prepared mixed retardant. The stored mixed retardant shall be tested as required in 3.9.1.1.4 and 3.9.1.1.5.

3.9.1.1.6 Corrosivity of Mixed Retardant from Stored Concentrate. The mixed retardant, prepared as required by 3.9.1.1.3, shall be tested to determine for uniform and intergranular corrosion and shall meet the uniform and intergranular corrosion requirements of 3.7.1 and 3.7.2.

3.9.1.2 Outdoor Stability of the Mixed Retardant. In accordance with 4.9.1.2, the mixed retardant shall be stored outdoors for 14 days.

At the end of the storage period, the stored mixture shall be examined visually and shall have no separation resulting in particles larger than 0.25-inch (0.635 cm) sieve size.

The stored mixed retardant shall be tested as required in 3.9.1.2.1 or 3.9.1.2.2. and 3.9.1.2.3.

TABLE G

Allowable Variation of Physical Properties of Stored Mixed Retardant.

| Property | Required Performance |
| --- | --- |
| Steady-State Viscosity | Shall be ≥60 percent of the initial value |
| Density | Shall be ±1 percent of the initial value |
| pH | Shall be ±0.75 units of the initial value |

3.9.1.2.1 Storable. In accordance with 4.9.1.2.1, the mixed retardant shall be stored outdoors for 52 weeks.

Following recirculation, there shall be no separation resulting in crystals or other particles larger than 0.25-in (0.635 cm) sieve size.

The mixed retardant shall be tested to determine the following physical properties:
  a. Steady-State Viscosity, in accordance with 4.6.3.1,
  b. Density, in accordance with 4.6.4, and
  c. pH, in accordance with 4.6.5.

These values shall be within the allowable variation from the initial values, determined in 4.5.3, physical properties, on the fresh retardant, as shown in Table G.

The mixed retardant shall meet the corrosion requirements shown in Table D for uniform and intergranular corrosion when tested in accordance with 4.7.1 and 4.7.2.

3.9.1.2.2 Not Storable. In accordance with 4.11.1.2.2, the mixed retardant shall be stored outdoors for 14 days.

Following recirculation, there shall be no separation resulting in crystals or other particles larger than 0.25-in (0.635 cm) sieve size.

The mixed retardant shall be tested to determine the following physical properties:
  a. Steady-State Viscosity, in accordance with 4.6.3.1,
  b. Density, in accordance with 4.6.4, and
  c. pH, in accordance with 4.6.5.

These values shall be within the allowable variation from the initial values, determined in 4.5.3, physical properties, on the fresh retardant, as shown in Table G.

3.9.2. Effect of Temperature Cycling on Wet Concentrate and Mixed Retardant. In accordance with 4.9.2, the wet concentrate and mixed retardant prepared from dry concentrate shall be subjected to temperature cycling.

The stored concentrate shall be tested to determine the following properties:
  a. Viscosity, in accordance with 4.6.3,
  b. Density, in accordance with 4.6.4, and
  c. pH in accordance with 4.6.5.

The results shall be made available to users as performance information.

The concentrate shall be used to prepare mixed retardant which shall be tested as required in 3.9.2.1.

3.9.2.1 Mix Retardant Prepared from Temperature-Cycled Concentrate. As required by 3.9.2, mixed retardant prepared from temperature-cycled concentrate and fresh water shall be tested in accordance with 4.9.3 to determine the following properties:
  a. Steady-State Viscosity, in accordance with 4.6.3.1,
  b. Density, in accordance with 4.6.4, and
  c. pH, in accordance with 4.6.5.

Changes in these properties shall be calculated.

Results will be made available to users as performance information.

3.9.3. Resistance of Wet Concentrates and Mixed Retardant to Microbial Growth. After 14 days in storage in accordance with 4.9.4, wet concentrates and mixed retardant shall show no visible sign of microbial contamination, including growths on the surface or within the fluid, significant discoloration, or other change in appearance.

3.10. Color Properties and Visibility. All mixed retardants shall be evaluated in accordance with 4.12.1 and 4.12.2 and meet the requirements of 4.10.1 and 4.10.2 as applicable for the color system used.

3.10.1. Color of Iron-Oxide Colored Retardant. The iron-oxide colored mixed retardant shall contain a minimum of at least 12 grams of iron oxide per gallon to impart red color to the mixed retardant.

3.10.2. Laboratory Evaluation of Fugitive-Colored Mixed Retardant. As required by 3.10.2.1 and 3.10.2.2, all fugitive-colored mixed retardant shall be tested to determine the opacity and fading of films applied in accordance with 4.10.1.1 through 4.10.1.4

3.10.2.1 Opacity of Fugitive-Colored Mixed Retardant. When tested in accordance with 4.10.1.2, all fugitive-colored mixed retardant shall be tested to determine their opacity on a 20-step black-white opacity chart.

The results shall be made available to users as performance information.

3.10.2.2 Fading of Fugitive-Colored Mixed Retardant. In accordance with 4.10.1.4, at the end of the exposure period in accordance with 4.10.1.3, the mixed retardant with fugitive colorant shall be no more colored than a sample of the uncolored product in water, applied and treated in the same manner as the mixed retardant.

3.10.3. Field Visibility. In accordance with 4.10.2, the visibility of each mixed retardant shall be determined by an experienced observer team designated by the government and shall meet the requirements in 3.10.3.1, 3.10.3.2, or 3.10.3.3.

All costs associated with the field visibility test shall be the responsibility of the submitter.

3.10.3.1 Field Visibility of Uncolored Mixed Retardant. The mixed retardant shall be determined to be not noticeably visible 24 hours after application.

3.10.3.2 Field Visibility of Iron Oxide-Colored Mixed Retardant. The mixed retardant shall be determined to be acceptably visible immediately after application.

3.10.3.3 Field Visibility of Fugitive-Colored Mixed Products. When tested in accordance with 4.10.2, all fugitive-colored mixed products for aerial application shall be determined to be acceptably visible immediately after application; and shall be determined to be not noticeably visible 3 months after application.

3.11. Air Drop Characteristics. When deemed necessary by the Forest Service and when tested in accordance with 4.11, the air drop characteristics of the mixed product shall be determined.

All costs associated with the air drop characteristics test shall be the responsibility of the submitter.

3.12. Operational Field Evaluation. In accordance with 4.12, after meeting requirements of 4.4 through 4.10, an analysis shall be undertaken to determine the need for an operational field evaluation. A copy of the analysis shall be provided to the submitter.

The analysis will document the rationale for no field test or provide a summary of the issues and performance to be addressed during the field evaluation.

Product for the operational field evaluation shall be purchased by the Forest Service or other cooperating agency according to the classification established during qualification testing. All other costs associated with the operational field evaluation shall be the responsibility of the submitter.

The product shall perform satisfactorily under operational conditions during a fire season. An acceptable test should include firefighting operations on a variety of fuel types, slopes, aspects, and exposures.

Operations should include both routine and accelerated burning conditions and multiple ignitions over several months.

4. TEST PROCEDURES. Detailed test methods are described in Standard Test Procedures for the Evaluation of Wildland Fire Chemical Products (STP). The web and postal addresses are given in 7.2.2.

4.1. Simplification of Terms. Specifying temperatures, sample containers, and coupons dimensions is cumbersome and leads to confusion regarding the required test.

The full description of these terms is provided as definitions in Section 6 and a simplified version is used throughout the remainder of this specification.

Evaluation and Exposure Temperatures. Frequently used exposure temperatures—including allowable ranges and conversions to Celsius are described in detail in Section 6.

Other temperature and range requirements are shown in detail within the applicable section of the specification.

Sample Containers. Two types of sample containers are used throughout the evaluation process. They are defined in Section 6 and referred to throughout the specification as a large sample container and a small sample container.

Coupons. Three types of coupons are used throughout the evaluation. They may be made of different alloys, but the dimensions in English and metric units are provided in Section 6 and referred to throughout the specification as a large stability coupon, a small stability coupon, and a corrosion coupon.

4.2. Determination of Laboratory Mixing Procedures (STP-3). As required by 3.3, procedures for the optimum mixing of the retardant shall be determined, in order to obtain maximum stability and performance characteristics.

4.3. Mammalian Toxicity and Irritation Tests (STP-1.2). As required by 3.4.1, mammalian toxicity and irritation testing on all wet and dry concentrates and mixed retardant, shall be conducted by an independent biological testing laboratory approved by the Forest Service.

All testing shall be conducted in compliance with 40 CFR 160 and 792 Good Laboratory Practice Standards, in accordance with EPA/OPPTS Health Effects Test Guidelines, Series 870 and shall include:

a. OPPTS 870.1100, Acute Oral Toxicity;
b. OPPTS 870.1200, Acute Dermal Toxicity;
c. OPPTS 870.2400, Primary Eye Irritation; in addition to the standard test, a test shall be performed with washed eyes.
In the test with washed eyes, three test animals shall be exposed to the test product for 30 seconds. The exposed eyes shall then be washed with room-temperature, deionized water for 1 minute. Examinations, schedules, and ratings shall be the same as for the standard test.
d. OPPTS 870.2500, Primary Dermal Irritation.

4.3.1. Report of Test Results. The results of mammalian toxicity and irritation testing shall be certified by the testing laboratory and submitted directly to the Project Leader, MTDC-WFCS Missoula, Mont. for review and recommendations.

4.3.2. Review of Mammalian Toxicity and Irritation Test Results. When required in accordance with 3.4.1.1.1, the Project Leader, WFCS shall review the results of the testing and the submitter's recommended protective gear and safe handling procedures to ensure adequate protection for workers and the general public who may come into contact with the product. Recommendations shall be reviewed by the Program Leader prior to final approval. For unusual situations, the Washington Office Safety and Health Branch will be contacted for technical assistance.

4.4. Fish Toxicity (STP-1.4). As required by 3.4.2, the toxicity of the concentrate to rainbow trout (Oncorhynchus mykiss) shall be determined in accordance with OPPTS 850.1075, Ecological Effects Test Guidelines, Fish Acute Toxicity Test, Freshwater and Marine.

Static test conditions in ASTM soft water (described in ASTM E 729) at 54±2° F. (12±1° C.) shall be maintained throughout the 96-hour test period.

All fish shall be 60±7 days post hatch.

4.5. Combustion Retarding Effectiveness Test (STP-2). As required by 3.5.3, when the retardant does not meet the requirements in 3.5.2, the combustion retarding effectiveness of the mixed retardant shall be determined.

Fuel beds of aspen excelsior or Ponderosa pine needles shall be prepared and treated with mixed retardant or 10.6-percent diammonium phosphate (control) and then dried at standard temperature and humidity to remove the water contained in the retardant or control.

The mixed retardant-treated fuel beds shall be tested and the effect of the mixed retardant on the rate of flame spread and rate of fuel weight loss determined.

The reduction index shall be calculated by comparing the rate of flame spread and rate of weight loss of the retardant-treated and control-treated beds to the untreated beds made from the same fuels as the treated beds.

4.6. Physical Properties. As required by 3.6, the concentrate and the mixed retardant shall be tested to determine the retarding salt content, refractometer reading, viscosity, steady state viscosity, density, and pH.

4.6.1. Retarding Salt Content Test (STP-4.1). As required by 3.6.3.1, the mixed retardant shall be tested using recognized analytical methods to determine the retarding salt content.

Ortho and total phosphate shall be determined in accordance with AOAC accepted test methods.

4.6.2. Refractometer Reading (STP-4.2). As required by 3.6.3, the refractometer reading of a properly mixed retardant shall be determined using a hand-held refractometer that incorporates the scale found in Reichert industrial fluid testers or the Brix scale.

4.6.3. Viscosity Test (STP-4.5). As required by 3.6.2 and 3.6.3, the viscosity of all wet concentrates and mixed retardants at 70° F. shall be measured using a Brookfield Viscometer, model LVF, or equal, set at 60 rpm with the appropriate spindle.

The same spindle shall be used for the initial and final viscosity measurements to determine stability performance.

4.6.3.1 Steady State Viscosity. As required by 3.6.3.2, the viscosity of the mixed retardant at 10 minutes, 1 hour, 4 hours, 8 hours, 1 day, and daily for 8 days after mixing shall be determined as described in 4.6.3.

Viscosity values shall be graphed against time. The viscosity value corresponding to the plateau of the viscosity curve, typically 24 hours, shall be determined. This shall be referred to as the steady state viscosity.

4.6.4. Density Test (STP-4.3). As required by 3.6.2 and 3.6.3, the density of the wet concentrate and mixed retardant shall be determined to the nearest 0.001 g/mL by fluid displacement or electronic density meter.

4.6.5. pH Value Test (STP-4.4). As required by 3.6.2 and 3.6.3, the pH of wet concentrates and mixed retardant shall be determined using a full range pH meter, capable of being read to 0.1 pH.

4.7. Materials Effects Tests. As required by 3.7, wet concentrates and mixed retardant shall be tested to determine uniform and intergranular corrosion of selected alloys and the effects to non-metallic materials.

4.7.1. Uniform Corrosion (STP-5.1). As required by 37.1, the uniform corrosion caused by the wet concentrate and mixed retardant shall be determined as summarized below.

Test coupons of 2024-T3 aluminum, 4130 steel, UNS C27000 yellow brass, and Az31B magnesium shall be engraved with a unique identification number, measured, cleaned, dried, and weighed.

Each coupon shall be immersed in the test solution and allowed to remain undisturbed at the required conditions for 90 days.

At the end of the test duration, each coupon shall be cleaned, dried, and weighed, and the corrosion rate calculated.

All corrosion rates for the same product, alloy, immersion condition and temperature shall be averaged.

4.7.2. Intergranular Corrosion Test (STP-5.2). As required by 3.7.2, mixed retardant shall be tested for intergranular corrosion.

At least one coupon from each exposure and temperature from the uniform corrosion tests on the specified alloys shall be sliced as shown in FIG. 3.

The coupon shall be mounted, polished to 0.3 micron alumna finish, and etched using Keller's reagent for aluminum coupons and Nital reagent for magnesium coupons.

The etched coupons shall be examined microscopically with a magnification of 500X.

4.7.3. Effect of Wet Concentrate and Mixed Retardant on Non-Metallic Materials (STP-5.3). As required by 3.7.3, the wet concentrate and all mixed retardants shall be tested to determine their effect on non-metallic materials, as summarized below.

Prior to exposure of the non-metallic materials, the hardness and volume of each non-metallic sample shall be determined. A hand-held durometer, of the prescribed type, shall be used to measure the hardness and either fluid displacement or dimensional analysis shall be used to determine the volume.

The test pieces of each non-metallic material shall be exposed for 20 cycles. Each cycle shall consist of the material being immersed in the fluid at night and on weekends and in the air during the work day.

At the end of the test period, each test piece shall be rinsed, allowed to air dry, and the hardness and volume of each piece determined on the same day as the exposure ends.

The change in hardness and volume from the initial value of each shall be calculated.

If the result of either exceeds the allowable maximum, the measurements shall be repeated the next day and the calculation of change calculated. No additional measurements shall be allowed.

The results of the last set of measurements taken shall be used to determine performance.

4.7.4. Abrasion Test (STP-7). As required by 3.7.4, the abrasiveness of the wet concentrate or mixed retardant from dry concentrate to aluminum 2024-T3 shall be determined as summarized below.

Abrasion tests shall be performed following acceptable results on the outdoor storage test.

A disc and a wear plate made of aluminum 2024-T3 shall be installed on the apparatus, parallel to each other with a 0.020-inch (0.5-mm) gap between them, and submerged in retardant.

The top plate shall be rotated at 1800 rpm for 50 hours.

The plate and disc shall be measured to the nearest 0.001 inch (0.025 mm) before and after the test.

The maximum wear on the disc and the wear plate shall be added to determine the total abrasion.

4.8. Pumpability Test (STP-6). As required by 3.8, the pumpability of the wet concentrate or mixed retardant from dry concentrate shall be determined as summarized below.

Pumpability tests shall be performed following acceptable results on the outdoor storage test. The test apparatus shall consist of a storage tank, a pump and a scale-mounted weighing tank.

The time required for the retardant to be transferred from the storage tank to the weighing tank shall be determined.

The change in weight over time shall be used to calculate the flow rate of the product.

4.9. Product Stability Test (STP-4). As required by 3.9, all concentrates and mixed retardant shall be tested for product stability as summarized in 4.9.1 through 4.9.3.

4.9.1. Outdoor Storage Test. As required by 3.9.1, concentrates and mixed retardant shall be tested to determine the effects of storage in outdoor weather conditions.

4.9.1.1 Concentrates. Each retardant concentrate shall be evaluated to determine outdoor stability in accordance with 4.9.1.1.1 or 4.9.1.1.2.

4.9.1.1.1 Dry Concentrates. As required by 3.9.1.1.1, each dry concentrate shall be evaluated for outdoor stability.

To document the initial condition of the product, the fresh concentrate shall be examined visually to determine the general condition of the concentrate, including the fluidity, presence or absence of lumps, the ease of crumbling the lumps, or visually separate layers.

The fresh concentrate shall then be stored, in large sample containers outdoors at MTDC-WFCS and San Dimas Technology and Development Center (SDTDC) for 52 weeks.

At the end of the 52 week storage period, the samples shall be examined visually to determine that there are not changes in the general condition, such as fluidity and/or presence of hard lumps, from the original sample.

As required by 3.9.1.1.3, the stored concentrate shall be used to prepare mixed retardant in accordance with 4.11.1.1.3.

4.9.1.1.2 Wet Concentrates. As required by 3.9.1.1.2, each wet concentrate shall be evaluated for outdoor stability.

The initial condition of the fresh concentrate shall be documented including the presence or absence of crystals or other solids greater than 0.25 inch (0.635 cm).

The fresh concentrate shall then be stored, in a large sample container containing a steel stability coupon, outdoors at MTDC-WFCS and SDTDC for 52 weeks.

At the end of the 52 week storage period, the sample shall be inspected to determine that changes from in the general condition of the concentrate have not occurred and tested as required in 3.9.1.1.2.

As required by 3.9.1.1.3, the stored concentrate shall be circulated and used to prepare mixed retardant in accordance with 4.11.1.1.3.

4.9.1.1.3 Mixed Retardants from Stored Concentrate. As required by 3.9.1.1.3, the mixed product shall be prepared using the method determined in 4.2.

As required by 3.9.1.1.4 and 3.9.1.1.5, mixed product shall be prepared from stored concentrate and fresh water and tested to determine the density, pH, and steady-state viscosity.

As required by 3.9.1.1.6 and 3.9.1.1.7, mixed product shall be prepared from stored concentrate and fresh water and tested to determine the outdoor stability and corrosivity of the mixed retardant from stored concentrate.

4.9.1.2 Mixed Retardant. Each mixed retardant shall be evaluated to determine outdoor stability in accordance with 4.9.1.2.1 or 4.9.1.2.2.

4.9.1.2.1 Storable. As required by 3.9.1.2.1, the mixed retardant shall be stored in large sample containers, each containing a large, mild steel stability coupon, outdoors at MTDC-WFCS and SDTDC for 52 weeks.

During the 52-week storage period, the sample shall be visually inspected monthly and any visual changes noted.

At the end of the 52-week storage period, the sample shall be mixed for 1 minute with low shear (1800 rpm with 2-bladed propeller-type stirrer).

The recirculated sample shall then be tested in accordance with 4.6 to determine steady-state viscosity, density, pH value, and 4.7.1 and 4.7.2 to determine uniform corrosion and intergranular corrosion.

4.9.1.2.2 Not Storable. As required by 3.9.1.2.2, the mixed retardant shall be stored in large sample containers, each containing a large, 2024-T3 aluminum stability coupon, outdoors at MTDC-WFCS and SDTDC for 14 days.

During the 14-day storage period, the sample shall be visually inspected at 7 and 14 days and any visual changes noted.

At the end of the 14-day storage period, the carboy shall be opened. The stored product shall be mixed for one minute with low shear (1800 rpm with 2-bladed propeller-type stirrer).

The recirculated sample shall be tested in accordance with 4.6 to determine, steady-state viscosity, density, and pH value.

4.9.2. Temperature Cycling Test. As required by 3.9.2, small sample containers containing 800-mL samples of the wet concentrate and mixed retardant prepared from dry concentrate shall be examined visually as described below.

At the beginning of the test, the physical appearance of each sample shall be described. The presence of growths on the surface or within the fluid, significant discoloration or other changes in odor or appearance which might be related to microbial degradation shall be noted.

The samples shall then be exposed to temperature cycling as described in 4.9.2.1 through 4.9.2.4. Each cycle shall consist of 1 day (8 to 10 hours) and the following night (or weekend).

Following each prescribed exposure, the samples shall sit for 24 hours at 70° F. to come to room temperature.

Each sample shall again be examined visually and any changes from the initial appearance noted. The density, viscosity, and pH of the samples shall be determined in accordance with 4.6.

As required by 3.9.2.1, the concentrate shall be used to prepare mixed retardant and tested in accordance with 4.9.3.

4.9.2.1 Exposure 1: The sample shall be stored for 30 cycles. Each cycle shall consist of 1 day at 70° F. and 1 night (or weekend) at 120° F.

4.9.2.2 Exposure 2: The sample shall be stored for 30 cycles. Each cycle shall consist of 1 day at 70° F. and 1 night (or weekend) at 15° F.

4.9.2.3 Exposure 3: The sample shall be stored for a total of 60 cycles. The first 30 cycles shall consist of 1 day at 70° F. and 1 night (or weekend) at 120° F. The last 30 cycles of 1 day at 70° F. and 1 night (or weekend) at 15° F.

4.9.2.4 Exposure 4: The sample shall be stored for a total of 60 cycles. The first 30 cycles shall consist of 1 day at 70° F. and 1 night (or weekend) at 15° F. The last 30 cycles of 1 day at 70° F. and 1 night (or weekend) at 120° F.

4.9.3. Performance of Mixed Retardant Prepared from Temperature-Cycled Concentrate. As required by 3.9.2.1, the temperature-cycled, wet concentrate shall be used to prepare mixed retardant in fresh water and tested to determine the density, pH, and steady-state viscosity.

4.9.4. Resistance to Microbial Growth Test (STP-6.4). As required by 3.9.3, the mixed retardant shall be tested, observed, and assessed for microbial contamination.

A small sample container containing 800 mL of the mixed retardant and a 2024-T3 aluminum small, stability coupon, shall be capped tightly to prevent evaporation, and allowed to sit undisturbed at 70° F. for 14 days.

The physical appearance, including growths on the surface or within the fluid, significant discoloration, or other changes shall be described and recorded at the initiation of the test and on days 1, 2, 7, and 14.

4.10. Visibility Tests. As required by 3.10 and at the fire chemical manufacturer's expense, the iron oxide-colored, uncolored, and fugitive-colored mixed retardant shall be tested to determine the visibility of the mixed products.

4.10.1. Laboratory Visibility Test of Fugitive-Colored Retardant. As required by 3.10.1, the mixed retardant shall be tested to determine the opacity and fading characteristics of the fugitive-colored retardant.

4.10.1.1 Preparation of the Test Panels. The fugitive-colored product and the product without color, as a control, shall be used to prepare the test panels.

Five test panels of plate glass shall be treated by applying a 0.064 inch (4 GPC) thick layer of the test product with a Gardner knife or equivalent.

Five control panels shall be treated in the same manner with the uncolored product.

4.10.1.2 Opacity of the Mixed Retardant (STP-10.2). As required by 3.10.2.1, the opacity of the mixed retardant film on the glass panel shall be determined immediately after application and again after 24 hours.

4.10.1.3 Light Exposure of the Mixed Retardant. The test and control panels shall be exposed outdoors to natural light at a test facility acceptable to the Forest Service.

All exposures shall be performed in accordance with ASTM G-24 (Standard Recommended Practice for conducting Natural Light Exposures) until 50,000 Langleys are accumulated.

Visual observations and photographic records shall be made after each 10,000 Langleys of exposure.

At the end of the exposure period, the test panels shall be returned to the laboratory for final assessment in accordance with 4.10.1.4.

4.10.1.4 Assessment of Fading. As required by 3.10.2.2, the acceptability of fading of the test panels shall be assessed.

The outer edges of the film shall not be considered during the assessment. This area, the outer edge of the film, approximately 1 in (2.5 cm), shall be removed or masked.

Each panel shall be examined and the appearance of the film shall be compared with the appearance of the control panels.

The appearance of the panels with the test material shall be neutral in color and not significantly different from the appearance of the control material.

4.10.2. Field Evaluation of Product Visibility (STP-10.3). As required by 3.10.3, the uncolored and fugitive colored enhanced water mixtures shall be tested for visibility on a variety of fuel types and conditions (slope, aspect, daylight conditions, and weather).

An experienced observer team, in the air at 2500 feet (762 meters), directly overhead, and on the ground, shall evaluate the visibility of each product applied by air dropping or ground tanker application depending on manufacturer's designated use.

4.11. Air Drop Characteristics Test (STP-9). As required by 3.11, and as deemed necessary by the Forest Service, the mixed retardant shall be tested to determine the air drop characteristics.

4.12. Operational Field Evaluation (STP-12). As required by 3.12, the Forest Service shall undertake an analysis to address any concerns arising from the nature of the formulations and/or results of the laboratory evaluation.

The laboratory testing shall be completed prior to conducting an operational field evaluation. When an operational field evaluation is needed, a test plan will be developed.

The evaluation will be conducted in accordance with the developed test plan. Detailed test methods are described in Standard Test Procedures for the Evaluation of Wildland Fire Chemical Products.

5. QUALIFICATION.

5.1. Qualification Tests. The samples submitted shall be subjected to the tests listed in Section 4 to determine if they meet the applicable requirements of Section 3 and classifications as indicated in 2.3.2.

These tests shall be conducted at the Forest Service WFCS laboratory or in third-party laboratories approved by WFCS on samples provided by WFCS. All reports of third-party testing will be submitted directly to WFCS.

5.1.1. Additional Testing at the Discretion of the Forest Service. Additional tests not specified in this document may be required at the discretion of the Forest Service when information provided in the product information or otherwise known to the Forest Service suggests a need.

The submitter shall be informed, before any additional testing is performed, of the specific tests to be performed, the reason for the tests, and the cost of the tests.

All costs of the additional testing shall be borne by the submitter.

5.1.2. Waiver of Testing at the Discretion of the Forest Service. At the discretion of the Forest Service, the requirement for the performance of specific tests may be waived.

When a test is waived, a written notice of the decision will be prepared by Forest Service WFCS and provided to the submitter.

5.2. Notice of Qualification. When the information submitted in accordance with 2.3.4 has been approved and the product is tested and found to meet all requirements of section 3, the products will be added to the Qualified Products List (QPL) and an informal notification made to the supplier.

A formal Notice of Product Qualification shall be issued in writing by the National Director, Fire and Aviation Management, USDA Forest Service.

5.2.1. Use of the Forest Service Shield or Implied Endorsement by the Forest Service. No use of the Forest Service shield is permitted. The logo is a protected image under Title 36, Code of Federal Regulations, Part 264. Use includes but is not limited to portrayal on product brochures, advertising, presentations, web sites, or other promotional items.

No statements implying endorsement by the Forest Service are permitted.

Following the laboratory evaluation of a product and listing on the QPL, the following statement may be used on product brochures or other similar informational material.

"This product has been evaluated by the USDA Forest Service and meets the requirements of Forest Service Specification 5100-304c for applications as determined during the product evaluation and shown on the QPL."

[Amendment 3 adds restrictions on the use of the Forest Service shield and certain language relating to product qualification.]

5.2.2. Ownership of Evaluation Results. The entity submitting the product and paying the costs of the evaluation is the only entity that may benefit directly from the results of the evaluation.

Information developed during the course of the evaluation will not be transferred to other parties except at the direct request of the submitter. The Forest Service will not acknowledge that a submitted formulation is similar to or the same as a product submitted by another. Testing of each product will proceed independently of products submitted by any other company.

The submitting entity may transfer the rights to the evaluation and listing on the qualified products list at its discretion; however, the Forest Service must be notified of such transfer to assure legitimate access to information on file.

5.2.3. Access to Product Information and Test Results. When a product is added to the Forest Service Qualified Products List (QPL), the product name, mix ratio, and classification shall be available to the public as part of the QPL. The results of all tests performed by the Forest Service will be summarized and made available to agency personnel and others upon request.

The performance information developed will be provided to user agencies as input to their procurement and decision-making processes.

5.3. Notice of Failure to Qualify. The submitter shall be notified in writing within 45 days following completion of testing if qualification cannot be granted.

Written notification shall include all test results and identify unacceptable performance.

5.4. Qualification of Changed or Modified Product. The Forest Service Branch Chief, Fire Equipment and Chemicals shall be notified of planned formulation changes. Any change to the formulation, including but not limited to changes in the type, quantity, quality, processing, supplier, manufacturer, or manufacturing site of individual ingredients shall be considered a formulation change.

Qualification testing may be required for any formulation change deemed significant by the Forest Service.

5.5. Acceptance Inspection and Quality Assurance Tests. During qualification testing, the Forest Service test facility shall establish requirements and procedures for lot acceptance and quality assurance of field shipments of product.

5.6. Other Tests. The Forest Service reserves the right to perform any other tests it deems necessary at agency expense.

6. DEFINITIONS.

Component. Each combination of ingredients, packaged together by the manufacturer for use in preparation of the mixed product by the user.

Mixed product shall be prepared by mixing a single component with water; except that in the case of enhanced water mixtures colored products may be prepared either by mixing a single component with water or by mixing an uncolored single component and a single color component with water.

Coupon, Large Stability. A metal sample, approximately 2 in×12 in×⅛ in (5 cm×30 cm×0.3 cm), made of mild steel or 2024-T3 aluminum for use in outdoor stability testing.

Coupon, Small Stability. A metal sample, approximately, 1 in×1 in×⅛ in (2.5 cm×2.5 cm×0.3 cm), made of mild steel or 2024-T3 aluminum for use in indoor stability testing.

Coupon, Corrosion. A metal test specimen, approximately 1 in×4 in×⅛ in (2.5 cm×10.2 cm×0.3 cm), made of 2024-T3 aluminum, mild steel, yellow brass, or Az31B magnesium for use in uniform corrosion testing.

Density. The weight in grams of 1 milliliter (mL) of product.

Dry Concentrate. A dry, single component, which is mixed with water to prepare the mixed retardant.

Exposure Cycle. Each exposure cycle shall consist of 1 day (8 to 10 hours) and the following night or weekend.

Forest Service. The term Forest Service as used throughout this document refers to the U.S. Department of Agriculture, Forest Service.

Fugitive Color. A coloring agent which imparts a high degree of visibility to the mixed product when first applied to wildland fuels but will gradually disappear over several months.

Hydration. The action of a combination of concentrate with water required to produce a thickened product.

Ingredient. Each single chemical used by the manufacturer in the formulation of the product. Intergranular Corrosion. A corrosive attack on metal at the grain boundary.

$LC_{50}$. The concentration of product in water, usually expressed as milligrams of product in a liter of solution that results in the death of 50 percent of the aquatic test specimens within a specified time frame.

$LD_{50}$. The dosage of a product, usually expressed as milligrams of the product per kilogram of body weight of the test animal, at which 50 percent of the test animals die within a specified time frame.

Long-Term Retardant. A product containing one or more inorganic salts to reduce the intensity of a fire. It contains water which serves to aid in uniform distribution of the retardant salts over the target fuel.

The product continues to be an effective fire retardant after the water it originally contained has completely evaporated.

Mixed Product. The combination of a wet or dry concentrate and water at the qualified mix ratio for use in fire management activities.

Mix Ratio. The proportion of concentrate and water in the mixed product.

The mix ratio can be expressed in several ways:
Pounds of dry concentrate added to a gallon of water
Gallons of wet concentrate to be added to a gallon of water
Volume percentage of concentrate and water—typical for foams and wet concentrate water enhancers pH. A measure of the acidity or alkalinity of a solution, represented on a numeric scale with 7 representing neutral solutions. Higher numbers represent alkaline solutions and lower numbers represent acidic solutions.

Reduction Index. A measure of the reduction in fire intensity (flame spread and weight loss) during the combustion retarding effectiveness test.

Retarding Salt. A single salt or combination of salts that impart combustion retarding effectiveness.

Sample Container, large. A 5.5-gallon (20 liter), low-density polyethylene carboy without spigot. Carboy shall be closed with a size 13.5 rubber stopper secured by a polypropylene screw cap.

Sample Container, small. A straight-sided, wide-mouth glass jar having a capacity of approximately 1 quart (946 mL) with Bakelite ® screw cap, 89 mm diameter with vinyl-backed fiber liner.

Standard Chemical. Technical grade diammonium phosphate (DAP) mixed with water to produce a 10.6-percent (weight/weight) solution. This solution is used as a reference for the combustion-retarding effectiveness test.

Steady State Viscosity. The viscosity after hydration is complete and viscosity is stable, Temperature. Each temperature included in the specification consists of a Fahrenheit temperature and allowable variation from that temperature and the Celsius equivalents for the temperature and range.

Commonly used temperatures and variations are shown in the first section below and included in the specification requirements and test descriptions by listing a simple Fahrenheit temperature.

Other temperatures are described in detail in the second section. Sufficient information is provided within the individual specification requirements and test descriptions to determine the proper choice of conditions.

| Fahrenheit | Variation | Celsius | Variation |
|---|---|---|---|
| 15° F. | ±5° F. | −9.4° C. | ±2.8° C. |
| 40° F. | ±5° F. | 4.4° C. | ±2.8° C. |
| 70° F. | ±5° F. | 21.1° C. | ±2.8° C. |
| 100° F. | ±5° F. | 37.8° C. | ±2.8° C. |
| 120° F. | ±5° F. | 48.9° C. | ±2.8° C. |
| 5° F. | ±2° F. | −15° C. | ±1° C. |
| 35° F. | ±2° F. | 2° C. | ±1° C. |
| 40° F. | ±2° F. | 4° C. | ±1° C. |

Uniform Corrosion. Removal of metal by chemical means over the entire surface. Viscosity. A measure of the resistance of a liquid to flow, expressed in centipoise (cP).

Water, Artificial Sea. A solution of chemicals in deionized water in the prescribed percentages to approximate natural seawater. All percentages are expressed as weight of chemical to total weight of solution.

Water, Deionized. Water treated by distillation, ion exchange, reverse osmosis, or a combination of these methods to remove most salts in conformance to ASTM D-1193 Type IV reagent water.

Water, Fresh. Tap water with a hardness of 120 to 140 ppm of calcium carbonate. A mixture of 3 volumes of ASTM hard water and 1 volume of ASTM soft water as defined in ASTM E-729 may be substituted for the fresh water.

Wet Concentrate. A liquid, single component, which is added to water to prepare the mixed product.

7. SOURCES FOR OBTAINING APPLICABLE DOCUMENTS.

7.1. Order of Precedence. In the event of conflict between the text of this document and the references cited herein, the text of this document takes precedence.

Nothing in this document, however, shall supersede applicable laws and regulations unless a specific exemption has been obtained.

7.2. United States Government Documents. The specifications, standards, and handbooks referenced form a part of this document to the extent specified herein. Unless otherwise specified, the issues of these documents in effect on the date of the invitation for bids or request for proposals shall apply.

7.2.1. Code of Federal Regulations (CFR). The text of the Codes of Federal Regulations are available at http://www.gpoaccess.gov/cfr/index.html 7.2.2. U.S. Department of Agriculture, Forest Service. The following Forest Service documents are available on the internet at www.fs.fed.us/rm/fire/wfcs/lt-ret.htm unless otherwise noted.

Paper copies of these documents can be obtained from the Program Leader or Project Leader, WFCS, 5785 Highway 10 West, Missoula, Mont., 59808, if web access is unavailable.

Manufacturer Submission Procedures for Qualification Testing of Long-Term Retardant Products.

Standard Test Procedures for the Evaluation of Wildland Fire Chemical Products, version in effect on the date of submission for evaluation.

USDA Forest Service Manual (FSM) 5160, Section 5162—Fire Management Chemicals. Available at http://www.fs.fed.us/im/directives 7.2.3. U.S. Department of Agriculture and U.S. Department of Interior; Interagency Standards. Interagency Standards for Fire and Fire Aviation Operation. Department of Agriculture, Forest Service, and Department of the Interior Agencies: Bureau of Land Management, National Park Service and U.S. Fish and Wildlife Service. Available at http://www.fire.blm.gov/Standards/redbook.htm 7.2.4. U.S. Environmental Protection Agency (EPA), Office of Prevention, Pesticides, and Toxic Substances (OPPTS). EPA documents can be obtained from the web site at http://www.epa.gov/opptsfrs/home/guidelin.htm or by mail from U.S. Environmental Protection Agency, National Service Center for Environmental Publication (NSCEP), P.O. Box 42419, Cincinnati, Ohio 45242.

7.2.5. United States Department of Health and Human Services, National Toxicology Program: Report on Carcinogens. Available at http://ntp-server.niehs.nih.gov/

7.2.6. International Agency for Research on Cancer (IARC). IARC Monographs of Carcinogens. Available at http://www-cie.iarc.fr/monoeval/grlist.html 7.2.7. Federal Standards. Federal Standards can be obtained from http://dsp.dla.mil/onlinedocs-dsp.htm 7.2.8. Military Specification. Military Specifications can be obtained from http://dsp.dla.mil/onlinedocs-dsp.htm 7.2.9. Freedom of Information Act (FOIA). The Forest Service FOIA information can be found at http://www.fs.fed.us/im/foia/

7.3. Other Publications. The following publications of the issue in effect on the date of invitation for bids form a part of this specification.

7.3.1. American Society for Testing and Materials (ASTM). Copies of ASTM publications can be obtained on the web at http://www.astm.org or by mail from ASTM, 100 Barr Harbor Drive, West Conshohocken, Pa. 19428-2959.

7.3.2. National Association of Corrosion Engineers International (NACE). Copies of NACE publications can be obtained on the web at http://www.nace.org or by mail from NACE International, 1440 South Creek Drive, Houston, Tex. 77084.

7.3.3. Society of Automotive Engineers, Inc. (SAE). Copies of SAE publications can be obtained on the web at http://sae.org or by mail from SAE International, 400 Commonwealth Drive, Warrendale, Pa. 15096-0001.

7.3.4. Association of Official Agricultural Chemists (AOAC). Copies of AOAC publications can be obtained on the web at _____ or by mail from AOAC International, 481 Frederick Avenue, Suite 500, Gaithersburg, Md. 20877-2417.

What is claimed is:

1. A fire-retardant concentrate composition comprising a mixture of ammonium phosphates and a corrosion inhibitor system that comprises at least one biopolymer, wherein the mixture of ammonium phosphates has a molar ratio of ammoniacal nitrogen to phosphorus (N/P molar ratio) in a range of from 1.4 to about 1.9, and wherein when the concentrate is mixed at a ratio of from about 0.9 to about 1.3 pounds of the concentrate per 1.0 gallon of water, the resulting aqueous solution exhibits a magnesium alloy corrosion rate equal to or less than 4.0 milli-inches per year.

2. The fire-retardant concentrate composition of claim 1, wherein the N/P molar ratio is from about 1.5 to about 1.9.

3. The fire-retardant concentrate composition of claim 1, wherein the N/P molar ratio is from about 1.6 to about 1.9.

4. The fire-retardant concentrate composition of claim 1, wherein the amount of ammonium phosphate in the fire-retardant concentrate is from about 75% to about 97% by weight of the total concentrate composition.

5. The fire-retardant concentrate composition of claim 1, wherein the ammonium phosphates comprise a mixture of at least two ammonium phosphates selected from the group consisting of ammonium orthophosphates, ammonium pyrophosphates, and ammonium polyphosphates having an average chain length of less than 20 phosphorus atoms.

6. The fire-retardant concentrate composition of claim 5, comprising at least two ammonium orthophosphates or at least two ammonium pyrophosphates.

7. The fire-retardant concentrate composition of claim 5, comprising at least one ammonium orthophosphate and at least one ammonium pyrophosphate.

8. The fire-retardant concentrate composition of claim 1, wherein the mixture of ammonium phosphates comprises monoammonium orthophosphate (MAP) and diammonium orthophosphate (DAP).

9. The fire-retardant concentrate composition of claim 1, wherein the mixture of ammonium phosphates consists essentially of monoammonium phosphate (MAP) and diammonium phosphate (DAP).

10. The fire-retardant concentrate composition of claim 8, wherein the mixture of ammonium phosphates comprises:
MAP containing from about 10% to about 12% ammoniacal nitrogen by weight and from about 40% to about 61% phosphorus pentoxide by weight; and
DAP containing from about 16% to about 21% ammoniacal nitrogen by weight and from about 40% to about 54% phosphorus pentoxide by weight.

11. The fire-retardant concentrate composition of claim 8, wherein the weight ratio of MAP to DAP is in the range of from about 5% to about 60% MAP to about 40% to about 95% DAP of the total ammonium phosphate in the concentrate.

12. The fire-retardant concentrate composition of claim 1, wherein the biopolymer portion of the corrosion inhibitor system is in an amount of from about 2.0% to about 8.5% by weight of the total concentrate composition.

13. The fire-retardant concentrate composition of claim 12, wherein the biopolymer portion of the corrosion inhibitor system is in an amount of from about 2.0% to about 3.0% by weight of the total concentrate composition.

14. The fire-retardant concentrate composition of claim 1, wherein the corrosion inhibitor system further comprises anhydrous sodium molybdate, its dihydrate, or mixtures thereof.

15. The fire-retardant concentrate composition of claim 14, wherein the amount of anhydrous sodium molybdate, its dihydrate, or mixtures thereof is in a range of about 0.01% to about 2.0% by weight of the total concentrate composition.

16. A fire-retardant concentrate composition comprising a mixture of ammonium phosphates and a corrosion inhibitor system that comprises a biopolymer selected from the group consisting of xanthan gum, rhamsan gum, welan gum, diutan gum, and mixtures thereof, wherein the mixture of ammonium phosphates has a molar ratio of ammoniacal nitrogen to phosphorus (N/P molar ratio) in a range of from about 1.1 to about 1.9, and wherein when the concentrate is mixed at a ratio of from about 0.9 to about 1.3 pounds of the concentrate per 1.0 gallon of water, the resulting aqueous solution exhibits a magnesium alloy corrosion rate equal to or less than 4.0 milli-inches per year.

17. The fire-retardant concentrate composition of claim 16, wherein the biopolymer is xanthan gum.

18. The fire-retardant concentrate composition of claim 16, wherein the biopolymer is diutan gum.

19. The fire-retardant concentrate composition of claim 1, further comprising a pigment or dye.

20. The fire-retardant concentrate composition of claim 19, wherein the pigment or dye is a fluorescent pigment or dye.

21. The fire-retardant concentrate composition of claim 19, wherein the pigment or dye is UV sensitive and/or formaldehyde-free.

22. The fire-retardant concentrate composition of claim 20, wherein the fluorescent pigment or dye has a Lab color spacing of "L" in a range about 34 to about 89, "a" in a range from about 18 to about 83 and "b" in a range from about −61 to about 56.

23. The fire-retardant concentrate composition of claim 1, wherein the composition comprises one or more additives selected from the group consisting of a flow conditioner, a surfactant, a foam controlling additive, a foam former, a biocide, and any combination thereof.

24. The fire-retardant concentrate composition of claim 16, wherein the N/P molar ratio is from about 1.4 to about 1.9.

25. The fire-retardant concentrate composition of claim 16, wherein the N/P molar ratio is from about 1.5 to about 1.9.

26. The fire-retardant concentrate composition of claim 16, wherein the N/P molar ratio is from about 1.6 to about 1.9.

27. The fire-retardant concentrate composition of claim 16, wherein the xanthan gum is in an amount of from about 2.0% to about 8.0% by weight of the total concentrate composition.

28. The fire-retardant concentrate composition of claim 16, wherein the xanthan gum is in an amount of from about 2.0% to about 3.0% by weight of the total concentrate composition.

29. The fire-retardant concentrate composition of claim 16, wherein the resulting aqueous solution exhibits a magnesium alloy corrosion rate equal to or less than 3.0 milli-inches per year.

30. The fire-retardant concentrate composition of claim 1, wherein the resulting aqueous solution exhibits a magnesium alloy corrosion rate equal to or less than 3.0 milli-inches per year.

* * * * *